US008061402B2

(12) United States Patent
Forbis et al.

(10) Patent No.: US 8,061,402 B2
(45) Date of Patent: Nov. 22, 2011

(54) METHOD AND APPARATUS FOR POSITIONING LAYERS WITHIN A LAYERED HEATER SYSTEM

(75) Inventors: Larry Forbis, New London, MO (US); Jason Miller, Hannibal, MO (US); Ken Gaulke, Hannibal, MO (US); Angie Privett, Hannibal, MO (US); Roger Brummell, Hannibal, MO (US); Tom LaMantia, Chesterfield, MO (US); Julie Tischer, Hannibal, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 286 days.

(21) Appl. No.: 12/098,827

(22) Filed: Apr. 7, 2008

(65) Prior Publication Data

US 2009/0250173 A1 Oct. 8, 2009

(51) Int. Cl.
*H01F 41/00* (2006.01)
*B65H 81/00* (2006.01)
*B65C 3/02* (2006.01)
*B29C 63/06* (2006.01)

(52) U.S. Cl. ........ 156/489; 156/184; 156/185; 156/187; 156/443; 156/475; 156/486; 156/492

(58) Field of Classification Search .................. 156/382, 156/489, 490, 492, 493, 538, 582, 583.3, 156/166, 169, 172, 183–184, 187, 443, 459, 156/468, 475, 476, 477.1, 486
See application file for complete search history.

(56) References Cited

U.S. PATENT DOCUMENTS

| | | | | |
|---|---|---|---|---|
| 614,689 | A * | 11/1898 | Beauregard | 156/475 |
| 1,641,045 | A * | 8/1927 | Oslund et al. | 156/215 |
| 2,119,371 | A * | 5/1938 | Von Hofe | 156/457 |
| 2,597,431 | A * | 5/1952 | Beck | 156/572 |
| 3,648,218 | A | 3/1972 | Kellerman | |
| 3,806,098 | A | 4/1974 | Clough | |
| 3,845,443 | A | 10/1974 | Fisher | |
| 3,880,609 | A | 4/1975 | Caddock | |
| 4,028,657 | A | 6/1977 | Reichelt | |
| 4,072,921 | A | 2/1978 | Sacchetti | |
| 4,980,014 | A * | 12/1990 | DiFrank et al. | 156/481 |

(Continued)

FOREIGN PATENT DOCUMENTS

CA 2018113 A1 2/1991

(Continued)

OTHER PUBLICATIONS

International Search Report and Written Opinion—PCT/US2008/070296.

(Continued)

*Primary Examiner* — Khanh P Nguyen
*Assistant Examiner* — Carson Gross
(74) *Attorney, Agent, or Firm* — Brinks Hofer Gilson & Lione

(57) ABSTRACT

An apparatus for positioning a tape preform as a layer onto a substrate during the manufacture of a layered resistive device is provided. The apparatus includes at least one positioning member, wherein the positioning member defines a proximal end portion and a distal end portion. The apparatus also includes a contact member adapted to engage the tape preform against the substrate. The contact member and the distal end portion of the positioning member are configured to position the tape preform onto the substrate.

33 Claims, 20 Drawing Sheets

U.S. PATENT DOCUMENTS

| | | | |
|---|---|---|---|
| 5,729,814 | A | 3/1998 | Suzuki et al. |
| 5,973,296 | A | 10/1999 | Juliano et al. |
| 6,652,906 | B1 | 11/2003 | Pinarbasi |
| 6,712,110 | B1 | 3/2004 | Nelson et al. |
| 7,196,295 | B2 | 3/2007 | Fennewald et al. |
| 2002/0195444 | A1 | 12/2002 | Lin et al. |
| 2005/0145617 | A1 | 7/2005 | McMillin et al. |
| 2006/0054616 | A1 | 3/2006 | Ptasienski |
| 2009/0020905 | A1 | 1/2009 | Privett |
| 2009/0021342 | A1 | 1/2009 | Brummell |

FOREIGN PATENT DOCUMENTS

| | | | |
|---|---|---|---|
| EP | 720416 | A | 7/1996 |
| EP | 1055978 | | 11/2000 |
| GB | 1132794 | | 11/1968 |
| GB | 2068173 | | 8/1981 |
| GB | 2316848 | A | 3/1998 |
| GB | 2338632 | A | 12/1999 |
| JP | 57178877 | | 11/1982 |
| JP | 62013285 | | 1/1987 |
| JP | 2000249584 | | 9/2000 |
| WO | WO 9803038 | | 1/1998 |
| WO | WO 0008527 | | 2/2000 |
| WO | 01/11924 | A | 2/2001 |
| WO | WO 0198054 | | 12/2001 |

OTHER PUBLICATIONS

International Search Report of PCT/US2008/070014.
International Search Report of PCT/US2009/039250.
*Thick Film Heaters Made from Dielectric Tape Bonded Stainless Steel Substrates*, S.J. Stein, R. Wahlers, M. Heinz, M.A. Stein—Electro Science Laboratories Inc. (USA); R. Tait, R. Humphries—Agmet Ltd. (UK), Presented at IMAPS, 1995.
U.S. Appl. No. 11/779,703, filed Jul. 18, 2007, Brummell et al.
U.S. Appl. No. 11/779,745, filed Jul. 18, 2007, Privett et al.
International Search Report and Written Opinion—PCT/US2008/070014.
International Search Report and Written Opinion—PCT/US2009/039250.

* cited by examiner

METHOD AND APPARATUS FOR POSITIONING LAYERS WITHIN A LAYERED HEATER SYSTEM

FIELD

The present disclosure relates generally to thick film resistive devices such as load resistors or layered heaters, and more particularly to methods of manufacturing such thick film resistive devices.

BACKGROUND

The statements in this section merely provide background information related to the present disclosure and may not constitute prior art.

Resistive devices such as layered heaters or load resistors are typically used in applications where space is limited, when heat output needs vary across a surface, or in ultra-clean or aggressive chemical applications. A layered resistive device, such as a layered heater, generally comprises layers of different materials, namely, a dielectric and a resistive material, which are applied to a substrate. The dielectric material is applied first to the substrate and provides electrical isolation between the substrate and the resistive material and also minimizes current leakage during operation. The resistive material is applied to the dielectric material in a predetermined pattern and provides a resistive heater circuit. The layered heater also includes leads that connect the resistive heater circuit to a heater controller and may include an optional over-mold material that protects the lead-to-resistive circuit interface. Accordingly, layered load devices are highly customizable for a variety of applications.

Individual layers of the resistive devices can be formed by a variety of processes, one of which is a “thick film” layering process. The layers for thick film resistive devices are typically formed using processes such as screen printing, decal application, or film printing heads, among others. In some applications, one or more of the layers may be formed of a section of tape or other flexible sheet of material that may be handled and manipulated to conform to the geometry of the substrate. The tape generally does not exhibit adhesiveness or tackiness, and as such, a process must be utilized to adhere the tape to the substrate. The tape must be positioned on the substrate during the adhering process. Such positioning may be performed manually by a human operator, however, such manual application of the tape or preform may lack speediness and reliability in the positioning process. The use of thick film tape on a layered load device was disclosed in pending patent application Ser. Nos. 11/779,703 and 11/779,745, which are hereby incorporated by reference in their entireties.

SUMMARY

In one form an apparatus for positioning a tape preform as a layer onto a substrate during the manufacture of a layered resistive device is provided. The apparatus includes at least one positioning member defining a proximal end portion and a distal end portion and a contact member adapted to engage the tape preform against the substrate. The contact member and the distal end portion of the positioning member are configured to position the tape preform onto the substrate.

In another form, an apparatus for positioning a tape preform as a layer onto a substrate during the manufacture of a layered resistive device is provided. The apparatus includes a base member, a plurality of grabber arms, and an elastic contact member. The grabber arms define a proximal end portion and a distal end portion, and the proximal end portion is mounted to the base member. Each grabber arm includes a support member proximate the distal end portion and a contoured inner profile surface extending between the proximal end portion and the distal end portion. The elastic contact member is secured to the base member and disposed around the support members of the grabber arms.

In yet another form, an apparatus for the manufacture of a layered resistive device is provided. The apparatus includes at least one first grabber arm defining a proximal end portion and a distal end portion. The first grabber arm has a contoured inner profile surface extending between the proximal end portion and the distal end portion. The apparatus further includes a first substrate mandrel, wherein a first substrate may be disposed proximate the first substrate mandrel, and a first contact member operable with the first grabber arm and adapted to engage a tape preform against the first substrate. The apparatus also has at least one second grabber arm defining a proximal end portion and a distal end portion. Like the first grabber arm, the second grabber arm has a contoured inner profile surface extending between the proximal end portion and the distal end portion. A second substrate mandrel is included, wherein a second substrate may be disposed proximate the second substrate mandrel. A second contact member is operable with the second grabber arm and adapted to engage a tape preform against a second substrate. The contact members and the contoured inner profile surfaces of the grabber arms are configured to sequentially position the tape preforms onto the substrates. The apparatus also includes at least one press positioned proximate the grabber arms and contact members. The press is adapted to be sequentially placed around each of the tape preforms and the substrates after the grabber arms and contact members have positioned the tape preforms onto the substrates.

In still another form, a method of positioning a tape preform as a layer onto a substrate during the manufacture of a layered resistive device is provided. The method includes locating the tape preform in a predetermined position, translating at least one of a positioning device, the substrate, and the tape preform relative to each other until a portion of the positioning device engages the tape preform, continuing the translation until the tape preform engages the substrate, and continuing the translation such that components of the positioning device progressively translate around the substrate and subsequently position the tape preform onto the substrate.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
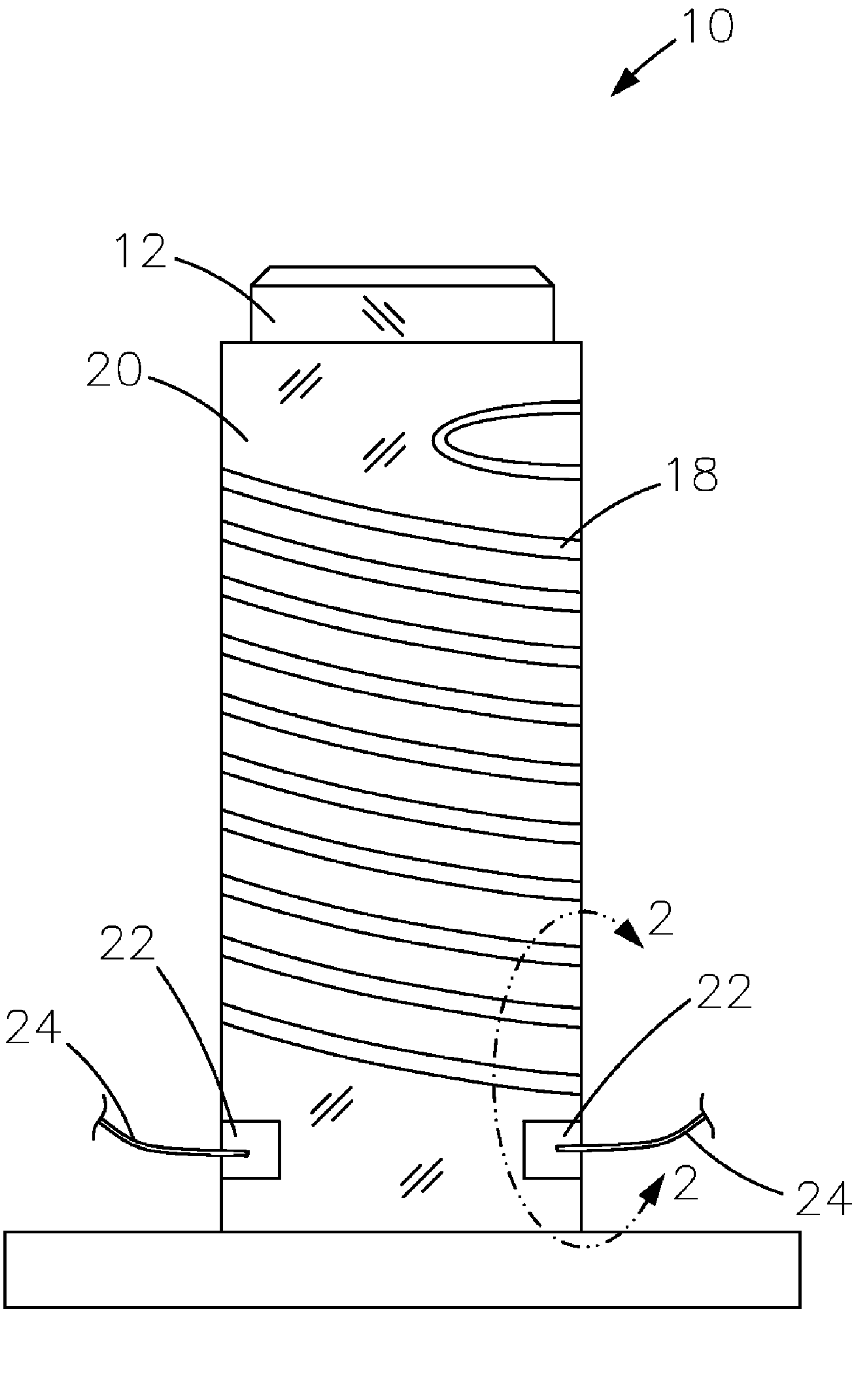
FIG. 1 is a side view of a layered resistive device disposed around a target and constructed in accordance with the principles of the present disclosure.

With reference to FIG. 1, an example of a layered resistive device 10 is illustrated. The layered resistive device 10 is disposed around a target 12, to which a resistive load or heat is to be provided by the layered resistive device 10. The layered resistive device 10 is illustrated as being tubular and co-axially disposed, by way of example, around the target 12. However, it should be understood that the layered resistive device 10 and the target 12 could have other configurations without falling beyond the spirit and scope of the present disclosure; for example, the tubular resistive device 10 could have a rectangular shape or a tubular shape having a slot therein.

The layered resistive device 10 comprises a substrate 20 upon which a number of functional layers are disposed. One of the functional layers is the resistive layer 18. The resistive layer 18 is shown wrapped around the substrate 20 in a spiral pattern; however, it should be understood that the resistive layer 18 could form any suitable pattern or be a continuous layer while remaining with the scope of the present disclosure. For example, the resistive layer 18 could form a square pattern, a saw tooth pattern, a sinusoidal pattern, or any other suitable pattern. In the alternative, the resistive layer 18 could be provided having no pattern at all, and instead could be a continuous sheet. In some forms, multiple dielectric and resistive layers 26, 18 could be used.

In two exemplary forms, the substrate 20 is formed of aluminum oxide ($Al_2O_3$) or 430 stainless steel; however, any other suitable material may be employed depending on the specific application requirements and the material being used for the various layers. Other suitable materials include, but are not limited to, nickel-plated copper, aluminum, stainless steel, mild steels, tool steels, refractory alloys, and aluminum nitride, among others.

For the layered resistive device 10 of FIG. 1, the resistive layer 18 provides a heater circuit; however, it should be understood that the resistive layer 18 could provide other functions while remaining within the spirit and scope of the present disclosure, in addition to a heater circuit or in the alternative. For example, the resistive layer 18 could serve as both a heater element and a temperature sensor, a form which is disclosed in U.S. Pat. No. 7,196,295, which is commonly assigned with the present application, and the contents of which are incorporated herein by reference in their entirety.

In some applications, the resistive layer 18 functions as a load resistor instead of a heating element. A resistive layer 18 designed as a load resistor preferably has minimal inductance and is formed in a sinusoidal pattern. Such a load resistor may be used to pack other components. Load resistors may help protect certain devices by acting as a power dump for other components, to isolate the devices from the power dissipated by such other components.

The resistive layer 18 is preferably connected to a pair of conductors 22, which are terminal pads that are further connected to a power source (not shown) through terminal wires 24. It should be understood that the conductors 22 could take forms other than terminal pads, without departing from the spirit and scope of the present disclosure, so long as the resistive layer 18 is electrically connected to a power source in another suitable manner. In one form, the conductors 22 could be omitted and the resistive trace of the resistive layer 18 could connect directly to the terminal wires 24. The terminal wires 24 could be any suitable electrical lead.

Figure 2:
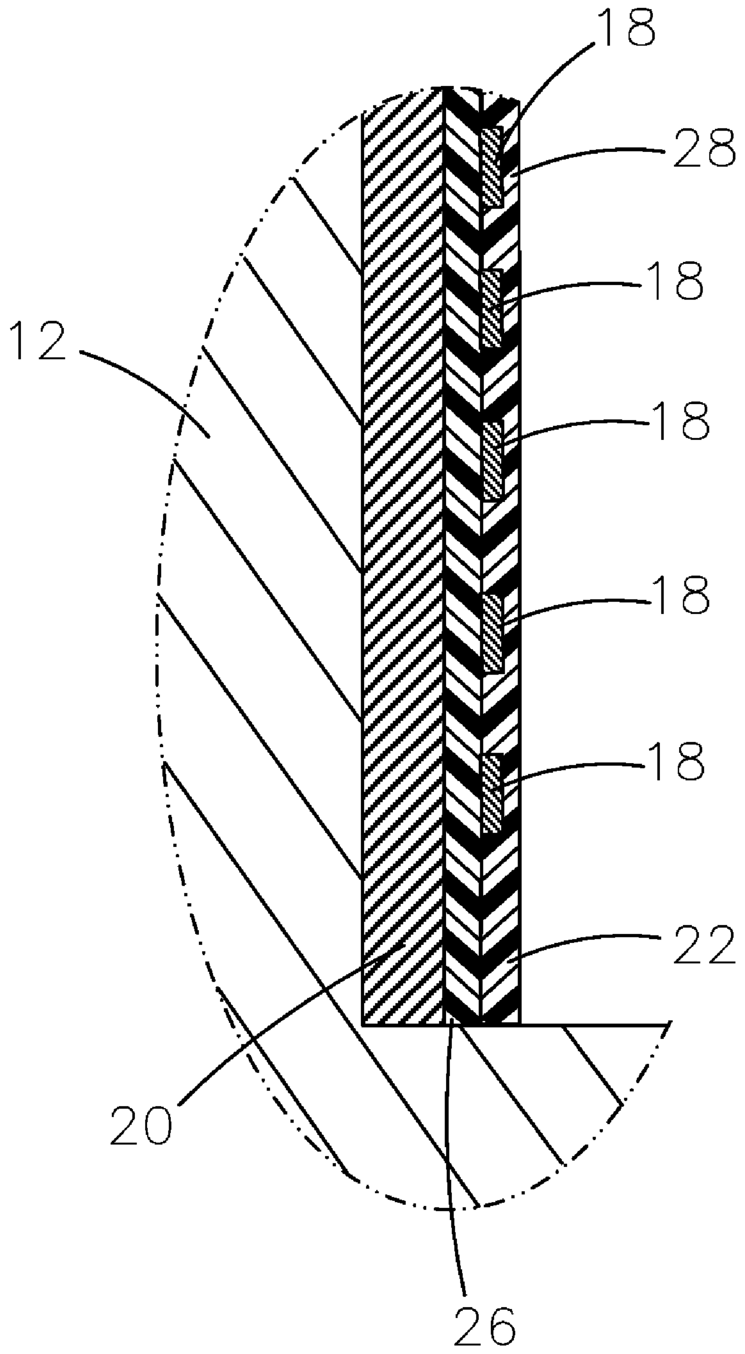
FIG. 2 is a partial cross-sectional view of a portion of the layered resistive device of FIG. 1, showing details of various layers on a substrate of the layered resistive device.

Referring now to FIG. 2, a cross section of the layered resistive device 10 taken along the partial detail 2-2 of FIG. 1 is illustrated. As shown, the layered resistive device 10 comprises the substrate 20 and several layers disposed on the exterior of the substrate 20. It should be understood that although the substrate 20 is shown in FIGS. 1-2, the substrate 20 is not a necessary element of the present disclosure. In some applications, the substrate 20 can be eliminated, and the layers can be applied directly to the target 12.

The layers disposed on the substrate 20 will now be described more particularly. A dielectric layer 26 is disposed on the surface of the substrate 20, which may be an exterior surface as shown, or any other surface of the substrate 20. Advantageously, the dielectric layer 26 is a thick film layer comprised of a single layer or multiple layers of dielectric tape in one form of the present disclosure. Although the dielectric layer 26 is disposed directly on the substrate 20, it should be understood that there could be an additional functional layer disposed between the substrate 20 and dielectric layer 26, while remaining within the spirit and scope of the present disclosure. For example, a bond layer, an EMF layer, a temperature sensor layer, or any other functional layer (not shown) could be disposed between the substrate 20 and the dielectric layer 26. Additionally or altneratively, the additional functional layer (not shown) could be positioned above the dielectric layer 26. The dielectric layer 26 helps provide electrical isolation between the substrate 20 and the resistive layer 18. Therefore, the dielectric layer 26 is disposed on the substrate 20 in a thickness commensurate with the power output of the resistive layer 18. A single layer or multiple layers of dielectric tape having the desired thickness may be applied to the substrate 20; the resistive layer 18 may then be disposed on the single layer or multiple layers of dielectric tape.

Prior to processing, the dielectric tape is a flexible sheet of material that may be handled and manipulated to conform to the geometry of the substrate 20 or target 12. The dielectric tape generally does not exhibit adhesiveness or tackiness, and as such, may be repositioned multiple times as necessary prior to laminating the tape to the substrate 20 or target 12, or other functional layer. As a dielectric tape, the material has dielectric properties, but these properties may not become apparent until after the dielectric layer is in its final form, i.e., after firing. Therefore, as used herein, the term "tape" (whether used for a dielectric layer, a resistive layer, a protective layer, or other functional layer) shall be construed to mean a flexible, sheet-like material that is manipulated to conform to, and to be laminated to, a substrate, a target, or other layer of the resistive device 10.

For a given application, it may be desirable that the dielectric layer 26 have sufficient dielectric strength to provide insulation between the materials disposed on each side of the dielectric layer 26, to prevent arcing therebetween. Likewise, thermal uniformity is often desired. A single layer of dielectric tape has been shown to have a desirable dielectric strength, uniform thickness, and thermal uniformity when used in a layered resistive device 10. Accordingly, the dielectric tape may be provided in the desired thickness according to application requirements. The type of dielectric tape chosen may depend on the substrate 20 material and the electrical output of the resistive layer 18. One preferred tape for a 430 stainless steel substrate, is a lead-free ceramic tape having a thickness of about 50-300 μm. It should be understood that a variety of dielectric tapes (materials and thicknesses) may be provided depending on the specific application, and thus the dielectric tape as described herein should not be construed as limiting the scope of the present disclosure. For example, in some forms, the tape preform could contain lead. Additionally, although only a single layer of the dielectric tape is sufficient for some applications, more than one layer of dielectric tape may be employed while remaining within the scope of the present disclosure. For example, several layers of the tape preform could be applied, and these layers could be applied one at a time, or multiple layers could be applied to the substrate 20 simultaneously.

As further shown, the resistive layer 18 is disposed on the dielectric layer 26. Typically, the resistive layer 18 takes on a pattern, and as described above, may also be provided in a continuous layer. The conductors 22 are typically disposed on the dielectric layer 26 and are in electrical communication with the resistive layer 18. In the alternative, the layered resistive device 10 could be provided without conductors 22. The resistive layer 18 may be formed by any suitable process while remaining within the spirit and scope of the present disclosure. For example, the resistive layer 18 may be applied by any layered process such as a thick film process, a thin film process, thermal spray, or sol-gel, among others. As used herein, the term "layered resistive device" should be construed to include devices that comprise at least one functional layer (e.g., dielectric layer 26 only, resistive layer 18 and dielectric layer 26, among others), wherein the layer is formed through application or accumulation of a material to a substrate, target, or another layer using processes associated with thick film, thin film, thermal spraying, or sol-gel, among others. These processes are also referred to as "layered processes" or "layering processes."

Thick film processes may include, by way of example, screen printing, spraying, rolling, and transfer printing, among others. Thin film processes may include, by way of example, ion plating, sputtering, chemical vapor deposition (CVD), and physical vapor deposition (PVD), among others. Thermal spraying processes may include, by way of example, flame spraying, plasma spraying, wire arc spraying, and HVOF (High Velocity Oxygen Fuel), among others.

In one form, the resistive layer 18 may be formed from a single layer of tape, or multiple layers of tape, which could be applied by the methods described in further detail below. The resistive layer 18 could be applied as a layer or layers of tape having no trace or pattern, or it could have a pre-determined trace or pattern that is applied to a substrate 20 as a tape preform. Additionally, the single layer or multiple layers of tape may be provided with a variable thickness such that the watt density of the resistive layer 18 can vary along the length of the trace or pattern, or across the continuous layer. It should be understood that such a variable thickness form of tape may also be provided for the other functional layers while remaining within the scope of the present disclosure.

The protective layer 28 is disposed on the resistive layer 18 and may also cover the conductors 22, so long as the conductors 22 may be electrically connected to the lead wires (FIG. 1) and/or a power source (not shown). Preferably, at least a portion of the conductors 22 are exposed through the protective layer 28. The protective layer 28 is preferably an insulator; however, other materials such as an electrically or thermally conductive material may also be employed according to the requirements of a specific application, while remaining within the spirit and scope of the present disclosure. In one form, the protective layer 28 is a dielectric material for electrical isolation and protection of the resistive layer 18 from the operating environment. As such, protective layer 28 may comprise a single layer or multiple layers of dielectric tape, similar to the dielectric layer 26 as previously set forth. In the alternative, the protective layer 28 could be applied using other thick film processes, including but not limited to screen printing, spraying, rolling, and transfer printing. Furthermore, the protective layer 28 could be applied by other layered processes such as sol-gel or thermal spray processes, among others, while remaining within the spirit and scope of the present disclosure. Generally, sol-gel layers are formed using processes such as dipping, spinning, or painting, among others.

In an alternate form, only the protective layer 28 is provided as a thick film dielectric tape, while the other layers are provided using one or more layered processes. For example, the dielectric layer 26 may be provided by a thick film, thin film, thermal spray, or sol-gel process. The resistive layer 18 would also be provided by a conventional method such as thick film, thin film, or thermal spray. In some applications, the resistive layer 18 is applied directly to the substrate 20, and the protective layer 28 is provided as a thick film dielectric tape and is disposed over the resistive layer 18.

Dielectric tape for use with the apparatus and method of the present disclosure may be provided in the desired thickness, as described above. The tape preform may be pre-cut to the desired size before laminating the dielectric tape to the substrate or target. In the alternative, the tape preform may be merely perforated on a roll to allow for easy detachment of pieces of tape having the proper size. In yet another alternative, the tape preform could be simply provided on a roll and cut for each application.

Figure 3:
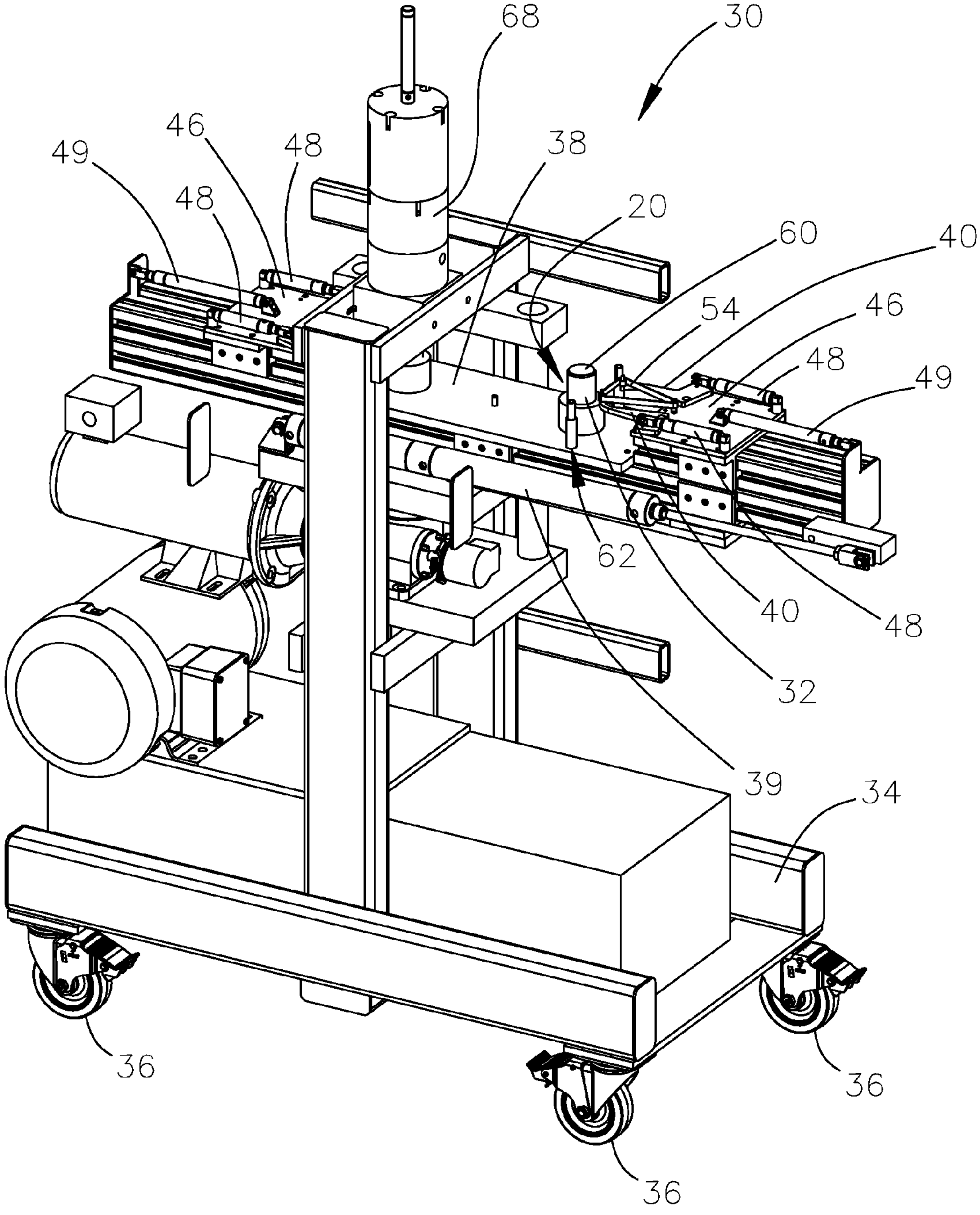
FIG. 3 is a perspective view of an apparatus for positioning a tape preform as a layer onto a substrate during the manufacture of a layered device constructed in accordance with the principles of the present disclosure.

Now with reference to FIG. 3, a positioning apparatus 30 for positioning a tape preform 32 as a layer onto a substrate 20, during the manufacture of a layered resistive device 10, is illustrated. As stated above, with reference to FIG. 2, the tape preform 32 could be applied as the dielectric layer 26, the resistive layer 18, or the protective layer 22. Moreover, it should be understood that the tape preform 32 could be applied as any other layer that may be desirable to apply to the substrate 20.

The positioning apparatus 30 may be provided on a cart 34 having wheels 36, such that the apparatus 30 defines a mobile unit; however, it should be understood that other configurations could also be used, without falling beyond the spirit and scope of the present disclosure.

Figure 4:
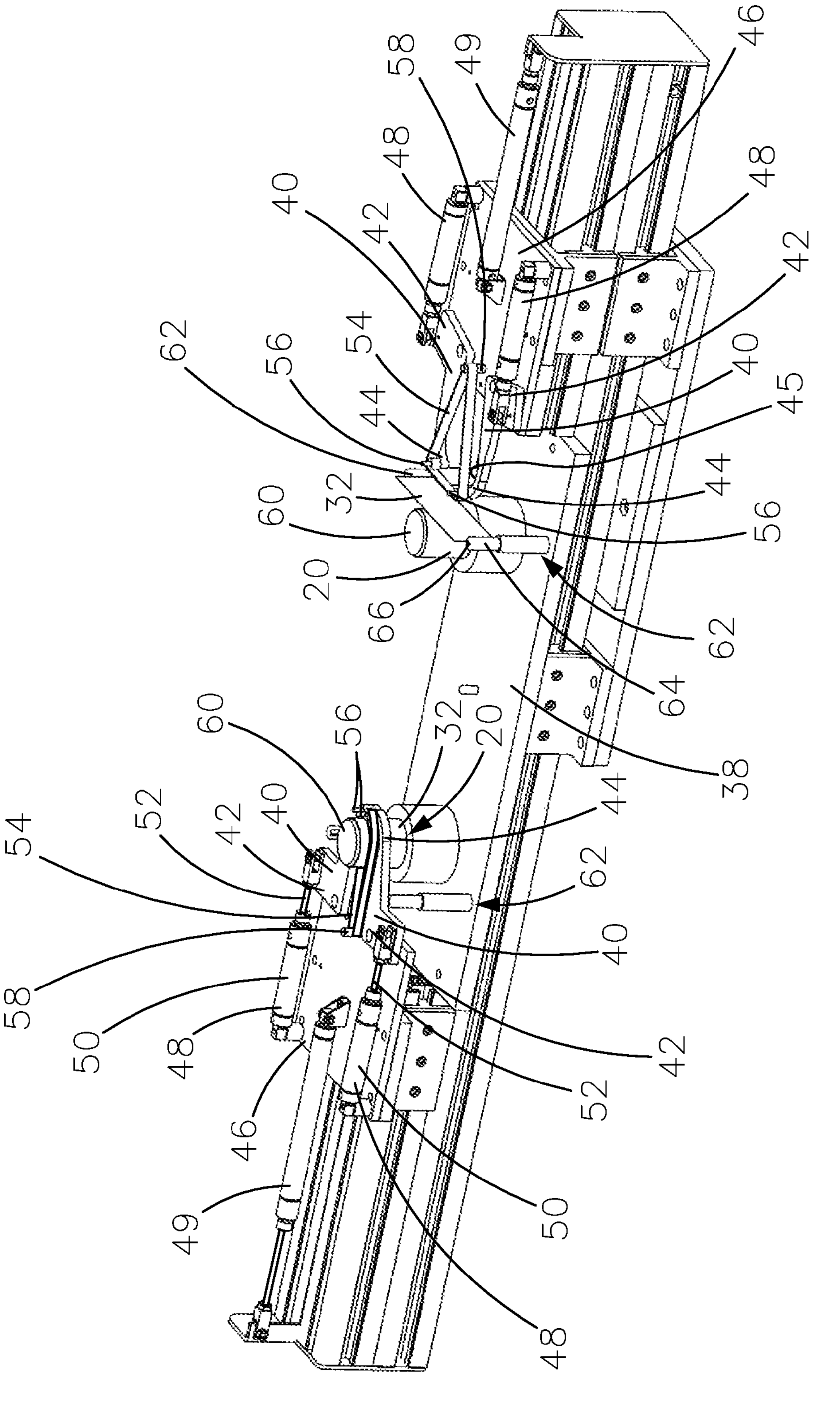
FIG. 4 is a perspective view of a portion of the apparatus of FIG. 3 in accordance with the principles of the present disclosure.
Figure 5:
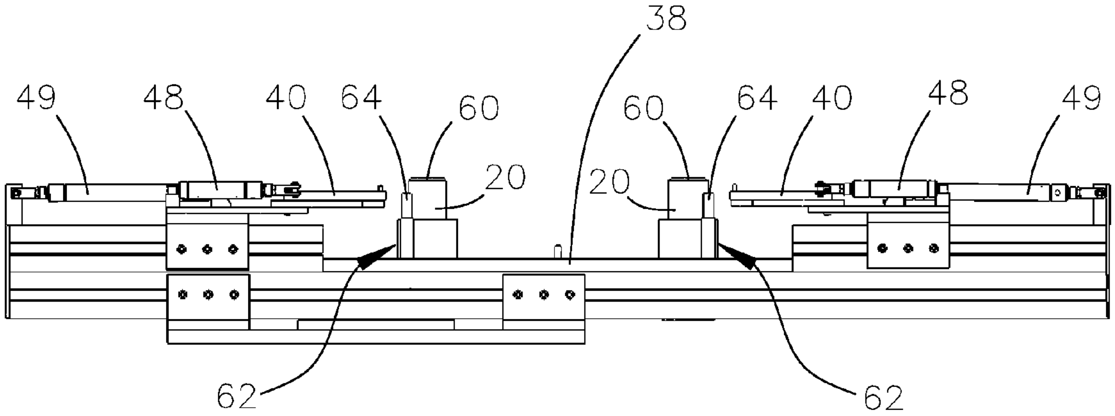
FIG. 5 is a side view of the portion of the apparatus of FIG. 4 in accordance with the principles of the present disclosure.
Figure 6:
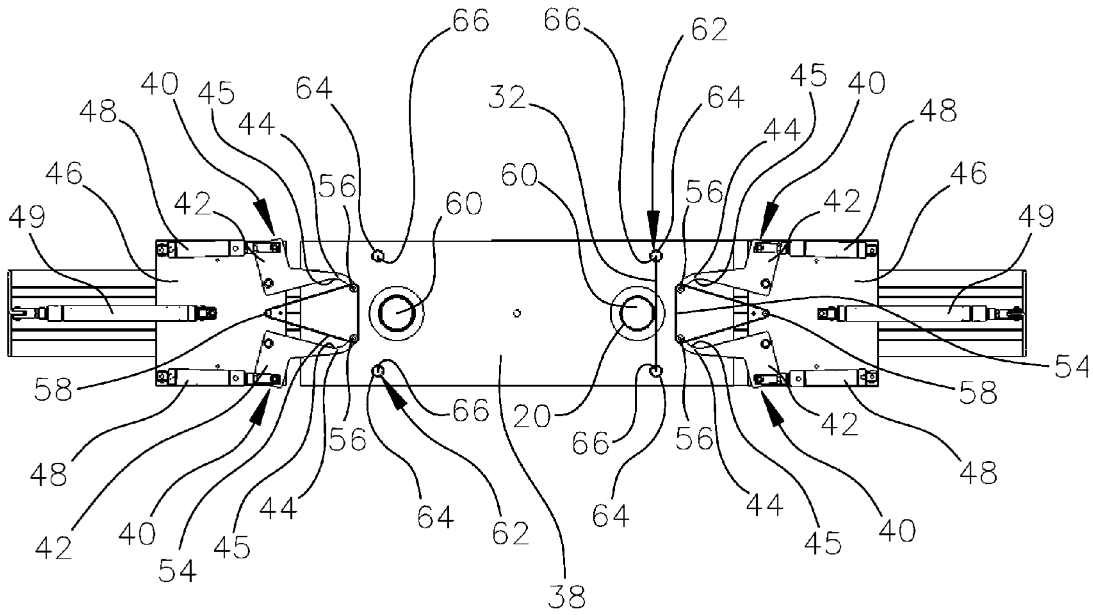
FIG. 6 is a plan view of the portion of the apparatus of FIGS. 4 and 5 in accordance with the principles of the present disclosure.

The positioning apparatus 30 has a positioning plate 38 for holding the substrate 20 while the tape preform 32 is positioned thereon. In some configurations, the positioning plate 38 may be a movable platform configured to translate the substrate 20. More particularly, the positioning plate 38 may be connected to a translating member 39, which is configured to translate the positioning plate 38. With reference to FIGS. 4-6, the positioning plate 38 is illustrated isolated from the rest of the positioning apparatus 30, and it should be understood that the positioning plate 38 need not be movable, and in some forms, the positioning plate 38 and components attached thereto could constitute the entirety of the positioning apparatus 30.

The positioning apparatus 30 has at least one positioning member, such as a grabber arm 40, and in one form, a plurality of grabber arms 40 as shown. Thus, although a set of two of grabber arms 40 is shown and described herein, it should be understood that, in some forms, a single grabber arm 40 could be used without falling beyond the spirit and scope of the present disclosure.

The grabber arm 40 defines a proximal end portion 42, a distal end portion 44, and a contoured inner profile surface 45 extending between the proximal end portion 42 and the distal end portion 44. The contoured inner profile surfaces 45 of the grabber arms 40 are configured to correspond with the shape of the substrate 20, which may be cylindrical as illustrated herein. As an alternative to cylindrical shapes, the substrate 20 and the contoured inner profile surfaces 45 of the grabber arms 40 may have other corresponding shapes, without falling beyond the spirit and scope of the present disclosure. Moreover, in some forms, the contoured inner profile surface 45 need not have a shape similar to that of the substrate 20.

The proximal end portion 42 is pivotally attached to a base member 46 via a pivoting member, which allows the grabber arms 40 to partially rotate with respect to the base member 46. Thus, the grabber arms 40 follow the contour of the substrate 20 as they move therearound, which is described in further detail below. With reference to FIGS. 4-6, two base members 46 are located at each end of the positioning plate 38. Each base member 46 has a set of two grabber arms 40 pivotally connected thereto at the proximal end portions 42 of the grabber arms 40.

The grabber arms 40 are also connected to opposed translation devices 48, which are attached to the base members 46. A translation device 48 is located on each side of the base members 46, and each translation device 48 is secured to the proximal end portion 42 of one of the grabber arms 40. Each translation device 48 may include, by way of example, an outer cylindrical member 50 that surrounds an inner cylindrical member 52. The inner cylindrical member 52 is configured to move outward from the outer cylindrical member 50 upon actuation to translate a portion of the grabber arm 40, causing the grabber arm 40 to pivot with respect to the base member 46 via its pivoting member.

For use with each pair of grabber arms 40, a contact member 54 is connected to the distal ends 44 of the pair of grabber arms 40. More particularly, the distal ends 44 include support members 56, and the contact member 54 engages the support members 56 and a dowel pin 58 that is connected to the base member 46. The support members 56 may be pivotally connected to the grabber arms 40. The contact member 54 is preferably an elastic band that is secured to the support members 56 and the dowel pin 58 by being disposed around the support members 56 and the dowel pin 58.

In order to apply the tape preform 32 to the substrate 20, the substrate 20 is placed on a substrate mandrel 60. In the form of FIGS. 4-6, one substrate mandrel 60 is provided for use with each base member 46 and each pair of grabber arms 40. A pre-positioning device 62 including a pair of holding pins 64 holds the tape preform 32 in place at a predetermined distance from the substrate 20, which is located around the substrate mandrel 60, prior to positioning the tape preform 32 onto the substrate 20. The predetermined distance could be equal to zero, such that the tape preform 32 contacts the substrate 20 when the substrate 20 is located on the substrate mandrel 60 and tape preform 32 is held by the pre-positioning device 62 (See FIG. 6). In other words, the pre-positioning device 62 is offset a predetermined distance from the substrate 20.

Although the pre-positioning device 62 is shown and described as having holding pins 64, it should be understood that the pre-positioning device could have any other holding member, without falling beyond the spirit and scope of the present disclosure. For example, square-shaped or other holding members, instead of holding pins 64, could be used.

The holding pins 64 of the pre-positioning device 62 define cutouts 66 for placement of the tape preform 32; however, it should be understood that the pre-positioning device 62 could have a variety of other configurations, without falling beyond the spirit and scope of the present disclosure. In the illustrated form, the pre-positioning device 62 and the substrate mandrel 60 are mounted to the positioning plate 38, which is in turn mounted to the translating member 39.

In some forms, the pre-positioning device 62 could include a vacuum source to provide a pulling force to the tape preform 32, to hold the tape preform 32 in place in the cutouts 66 of the holding pins 64. The vacuum source could include, by way of example, a manifold having apertures and/or vacuum hoses disposed on the base member 46 or the positioning plate 38 to apply a vacuum to the tape preform 32.

The contact member 54 is operable with a pair of the grabber arms 40 to engage the tape preform 32 against the substrate 20, when the substrate 20 is disposed proximate the substrate mandrel 60. Upon actuation of the translation devices 48, the grabber arms 40 pivot at their proximal end portions 42. By virtue of an additional translation device 49, the base member 46 is translated toward the substrate 20, and this translation in conjunction with the translation provided by the translation devices 48 causes the grabber arms 40 to be translated around the substrate 20 and the contact member 54 to engage the tape preform 32 against the substrate 20. The translation of the grabber arms 40 around the substrate 20 occurs by virtue of both the translations provided by the translation devices 48 secured to the grabber arms, and by virtue of the translation provided by the additional translation device 49 that is secured to the base member 46. The contoured inner profile surfaces 45 of the grabber arms 40 allow the grabber arms 40 to move the support members 56 around and in contact with the periphery of the substrate 20 through the contact member 54 to press the tape preform 32 against the periphery of the substrate 20.

Figure 7:
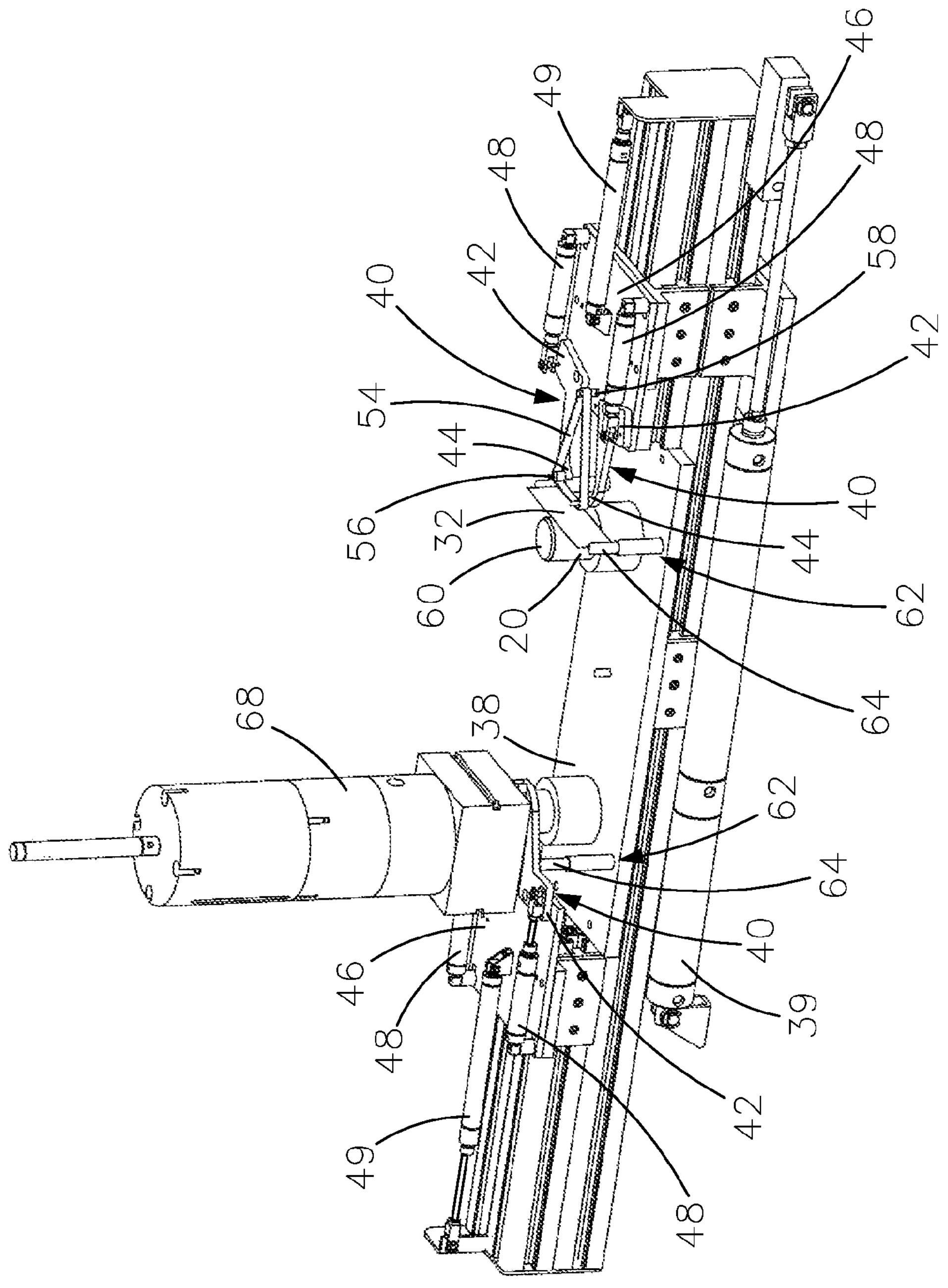
FIG. 7 is a perspective view of a portion of the apparatus of FIG. 3 in accordance with the principles of the present disclosure.

The substrate mandrels 60 are mounted on the positioning plate 38, which may be secured to the translating member 39. The translating member 39 is configured to translate the positioning plate 38 to align the substrate mandrels 60 with a press 68 that is vertically positioned with respect to the substrate mandrels 60 (See FIGS. 3 and 7).

The positioning apparatus 30 may also have a controller to control the translating member 39 of the positioning plate 38, for example, to move the substrate mandrels 60 between starting positions and positions aligned with the press 68. In other words, the controller could be configured to move the positioning plate 38 back and forth to position each substrate mandrel 60 under the press 68 in a sequential manner.

The controller could also be configured to communicate with the translation devices 48, 49 that position the grabber arms 40 and contact members 54. Thus, the controller could be configured to actuate each of the translation devices 48, 49 to move the grabber arms 40 and contact members 54. For example, with reference to FIGS. 3-7, the controller could actuate the translation device 49 to move the base member 46 with respect to the positioning plate 38. Because the grabber arms 40 are attached to the base member 46, such actuation of the translation device 49 would have the effect of moving the grabber arms 40 toward the substrate 20 and moving the distal ends 44 past the substrate 20. The controller could also actuate the translation devices 48 to pivot the grabber arms 40 at their pivot members to allow the grabber arms 40 and contact member 54 to position the tape 32 against the substrate 20 as the grabber arms 40 move around the substrate 20. In some forms, the controller could actuate simultaneously both the translation devices 48 attached to the proximal ends 42 of the grabber arms 40 and the translation device 49 attached to the base member 46. The effect of the simultaneous actuation would be to move the grabber arms 40 toward and around the substrate 20, while the positioning members 56 of the distal ends 44 press the contact member 54 against the tape 32 and the substrate 20.

Figure 8A:
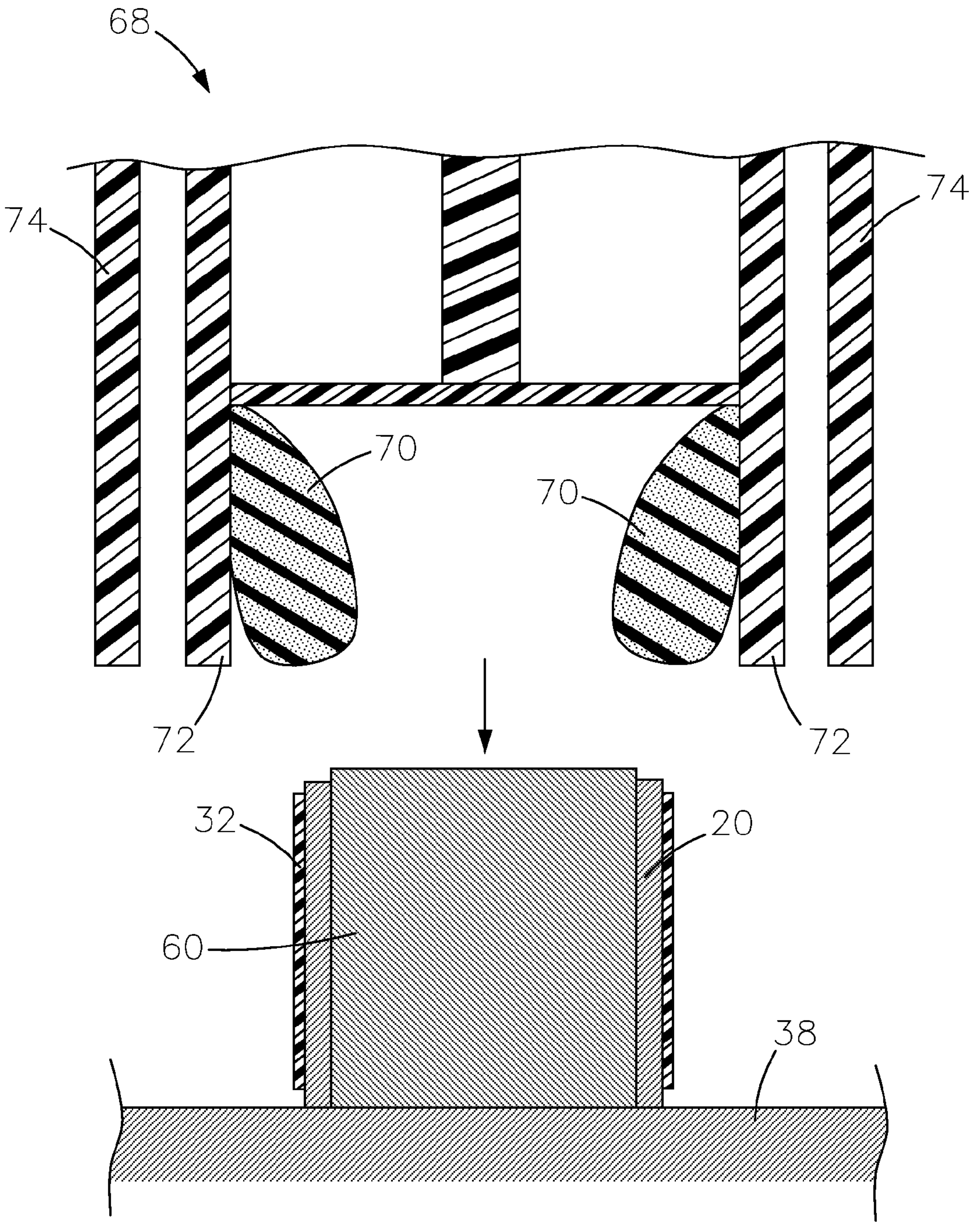
FIG. 8A is a schematic sectional view of a bladder press in a collapsed state and a tubular substrate having a tape preform disposed on its exterior surface, in accordance with the principles of the present disclosure.
Figure 8B:
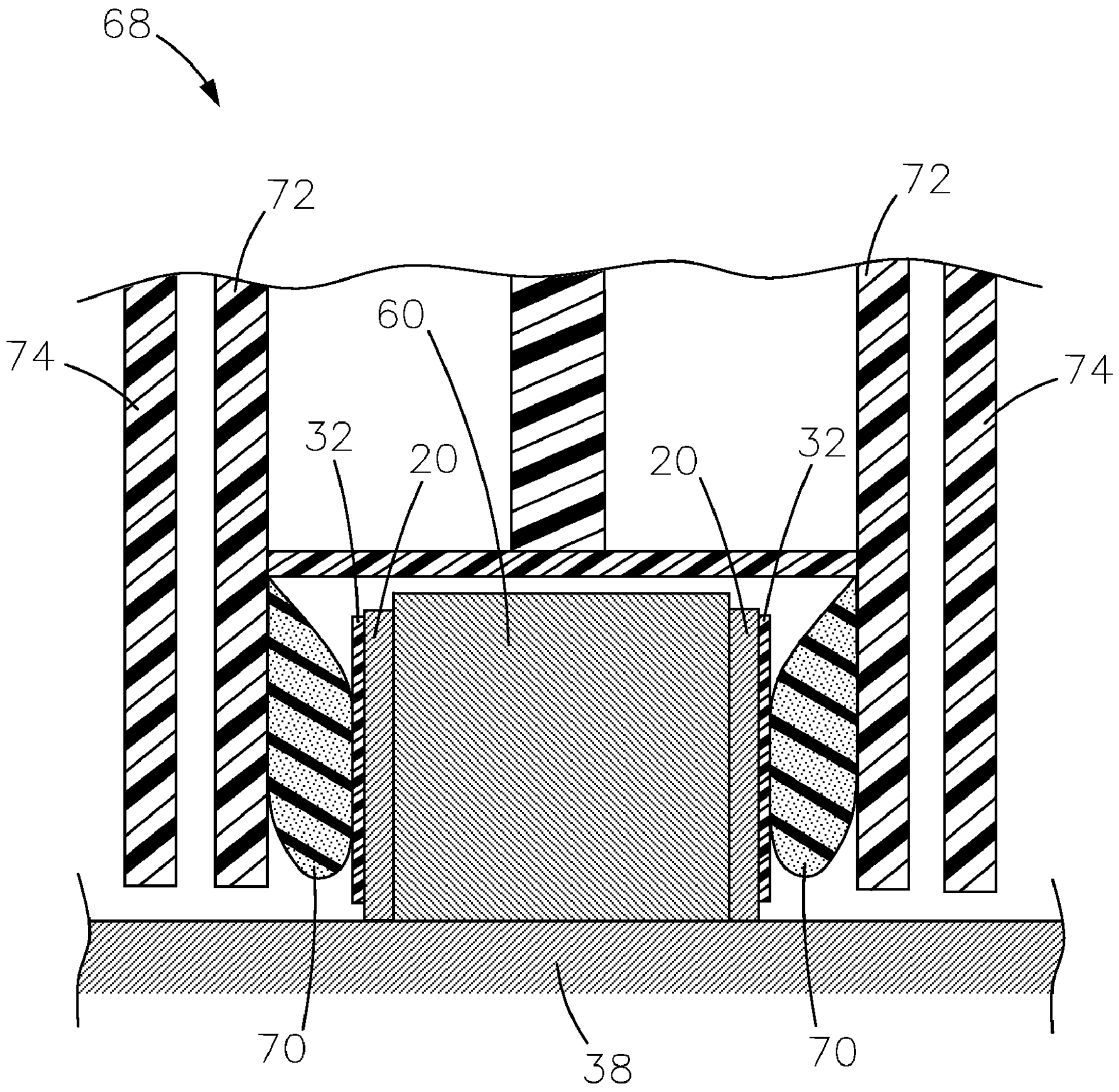
FIG. 8B is a schematic sectional view of the bladder press and substrate of FIG. 8A, showing the bladder of the bladder press disposed around the substrate, according to the principles of the present disclosure.
Figure 8C:
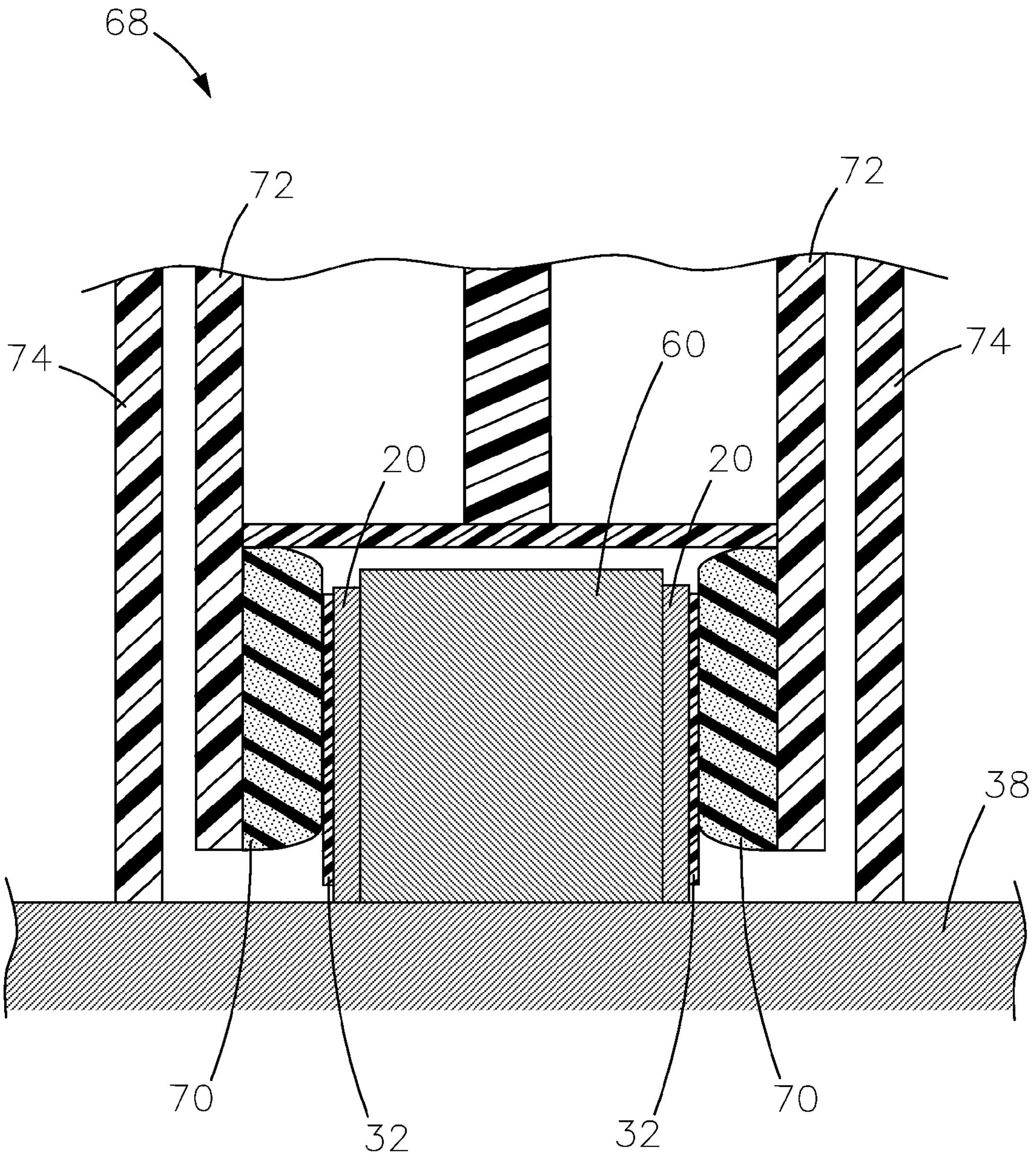
FIG. 8C is a schematic sectional view of the bladder press and substrate of FIGS. 8A and 8B, showing the bladder in an expanded state, in accordance with the principles of the present disclosure.

With reference to FIGS. 8A-8C, the press 68 is illustrated in more detail. The press 68 includes a bladder 70, which, in one form, is substantially cylindrical such that it may be lowered toward and around the substrate 20 and tape preform 32, which are located around the mandrel 60. The bladder 70 is movable between an expanded state and a collapsed state.

To begin the process of adhering the tape preform 32 to the substrate 20, the press 68, including the bladder 70, is advanced toward the substrate 20, tape preform 32, and mandrel 60. With reference to FIG. 8B, the substrate 20, tape preform 32, and mandrel are received within the center of the cylindrical bladder 70 of the press 68. During this reception, the bladder 70 is preferably in the collapsed state such that it may fit between the substrate 20 and the press wall 72 and the substrate 20.

With reference to FIG. 8C, a fluid medium is released or inserted into the bladder 70 to inflate the bladder 70 into the expanded state. The fluid medium may comprise water, air, or any other suitable medium. When in the expanded state and inserted around the substrate 20 and tape preform 32, the bladder 70 is tightly pressed up against the tape preform 32 and the outer surface of the substrate 20. In other words, the bladder 70 engages the tape preform 32 to press it against the outer surface of the substrate 20, in the expanded state. Preferably, the grabber arms 40 and contact member 54 (not shown in FIGS. 8A-8C) remain in contact with the tape preform until such inflation of the bladder 70 to ensure that the tape preform 32 remains uniformly pressed around the substrate 20.

After the grabber arms 40 retract from the substrate 20, the entire assembly, including the mandrel 60, the substrate 20, the tape preform 32, the bladder 70, and the press wall 72, is enclosed in a pressurized vessel 74. The pressurized vessel 74 may be part of the press 68 and may be lowered to surround the press wall 72 and contact the positioning plate 38; however, it should be understood that the pressurized vessel 74 could have any suitable configuration, without falling beyond the spirit and scope of the present disclosure. For example, the press 68 and the substrate 20 could simply be moved into a pressurized vessel, or the room surrounding the press 68 and the substrate 20 could be an isostatic, hydrostatic, or hydraulic press.

Within the pressurized vessel 74, a predetermined cycle of pressure, temperature, and time is applied to the substrate 20 and tape preform 32 to laminate or adhere the tape preform 32 to the substrate 20. Preferably the predetermined cycle of pressure, temperature, and time is a single cycle. The bladder 70 helps facilitate a uniform application of pressure to the outer surface of the tape preform 32. Thus, the bladder 70 is preferably maintained in the expanded state through the predetermined cycle of pressure, temperature, and time. Such a uniform application of pressure causes the tape preform 32 to be laminated to the substrate 20 with a substantially uniform thickness and adhesion.

The cycle of pressure, temperature, and time may be applied using an isostatic press, or the cycle may be applied in another suitable manner. In other words, the press 68 could be an isostatic press. In the alternative, the press 68 could be a hydraulic or hydrostatic press. An isostatic press subjects a component to both temperature and isostatic pressure in a high pressure containment vessel. The medium used to apply the pressure could be an inert gas, such as Argon, a liquid, such as water, or any other suitable medium. The pressure being isostatic, it is applied to the component from all directions.

In one form, the pressure to be applied is in the range of about 50 to about 10,000 psi (pounds per square inch), the temperature to be applied is in the range of about 40 to about 110° C., and the amount of time in the cycle for applying the temperature and pressure is in the range of about 5 seconds to about 10 minutes. The particular pressure, temperature, and time to be applied depend on the size of the parts and the characteristics of the materials.

After the cycle is completed, the press 68 is raised away from the substrate 20. Thereafter, the substrate 20 with the attached tape preform 32 is preferably fired in a furnace (not shown). As referred to herein, the firing process could comprise multiple stages, such as, by way of example, a separate burn out and firing process. One or more drying steps could also be used.

When the press 68 is raised away from the substrate 20, the translating member 39 of the positioning apparatus 30 is configured to translate the positioning plate 38 to move the pressed substrate 20 including the tape preform 32 laminated thereto away from the press 68 and to simultaneously move another substrate 20 and tape preform 32 located on the other side of the positioning plate 38 toward the press 68. In this way, the translating member 39 of the positioning plate 38 sequentially moves each substrate 20 and tape preform 32 under the press 68 such that the press 68 may be sequentially placed over each substrate 20 and tape preform 32, each tape preform 32 being held around each substrate 20 by the sets of grabber arms 40 and contact members 54 located at each end of the positioning plate 38 on the base members 46, as hereinbefore described.

Figure 9:
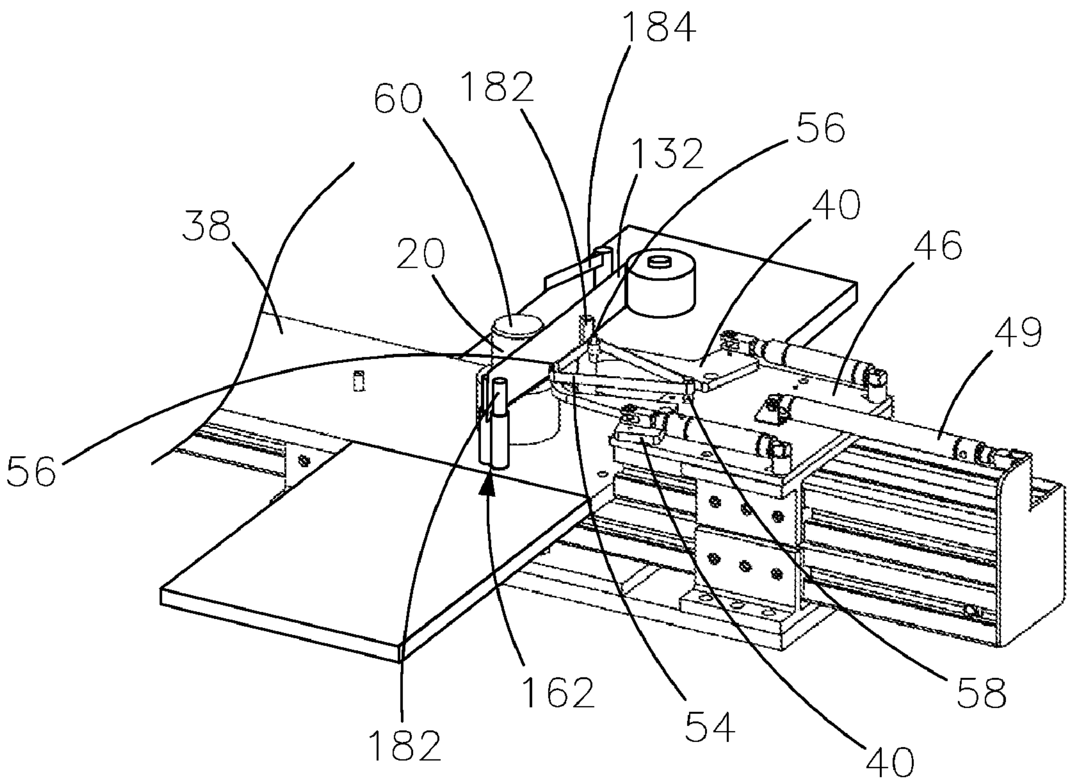
FIG. 9 is a perspective view of a portion of the apparatus of FIG. 3, having a different form of a pre-positioning device, in accordance with the principles of the present disclosure.
Figure 10:
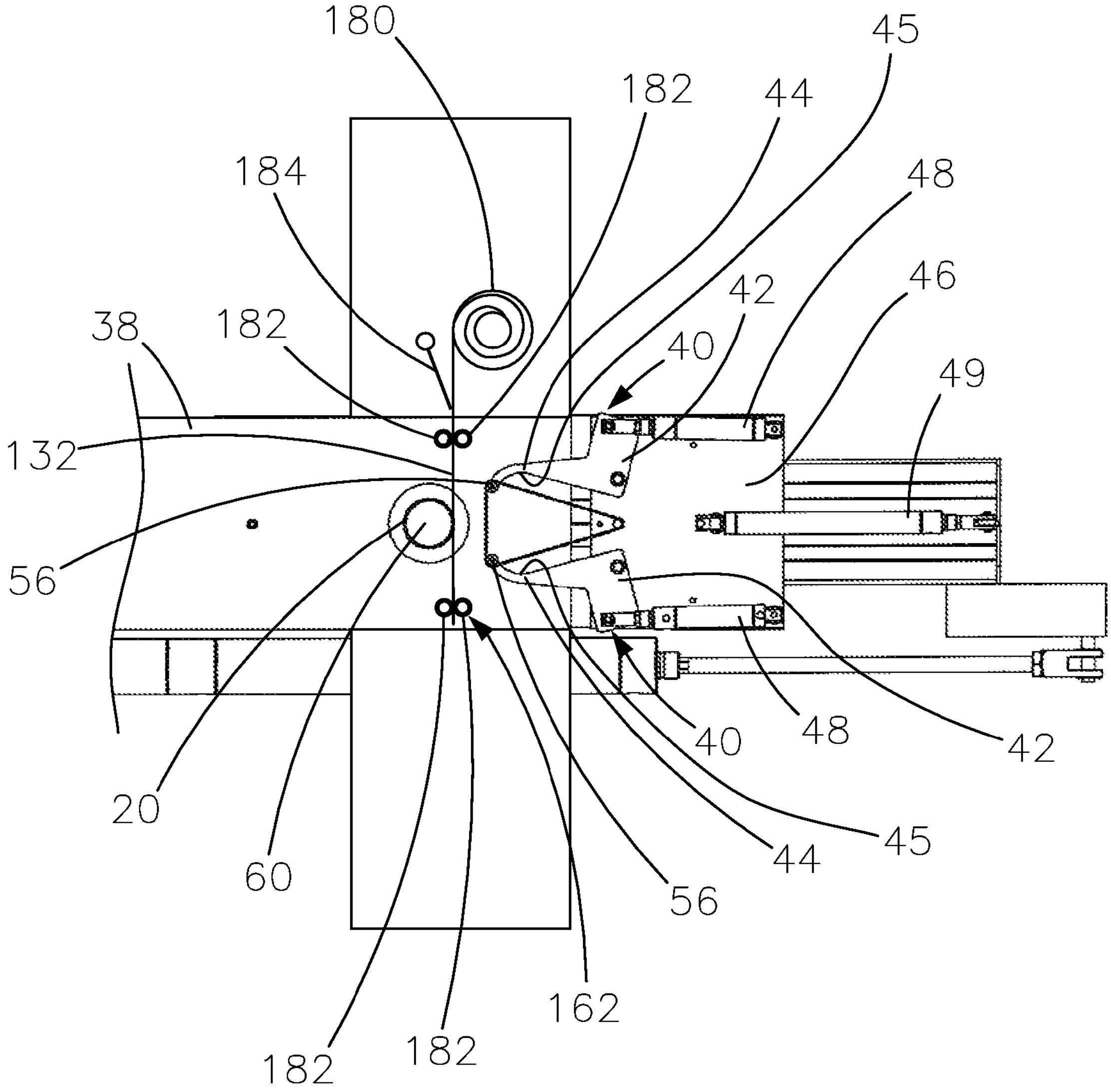
FIG. 10 is a plan view of the portion of the apparatus of FIG. 9.

Now with reference to FIGS. 9 and 10, another variation of the tape preform 132 and the pre-positioning device 162 for use with the positioning apparatus 30 is illustrated. In this variation, the tape preform 132 is part of a continuous stock of tape preform 180, in other words, a roll of tape. The pre-positioning device 162 includes reels 182 that feed the continuous stock of tape preform 132 therethrough. A cutting device 184, such as a knife, may be used to cut the tape preform 132 to a predetermined size. The cutting device 184 could be used to cut the tape preform 132 either before, during, or after the tape preform 132 is positioned on the substrate 20.

In some variations, the tape preform 132 could be provided with pre-cut portions, such as perforations, which could be configured to allow the preform tape 132 to be automatically torn off, or to allow the preform tape 132 to be more easily cut by the cutting device 184.

Figure 11:
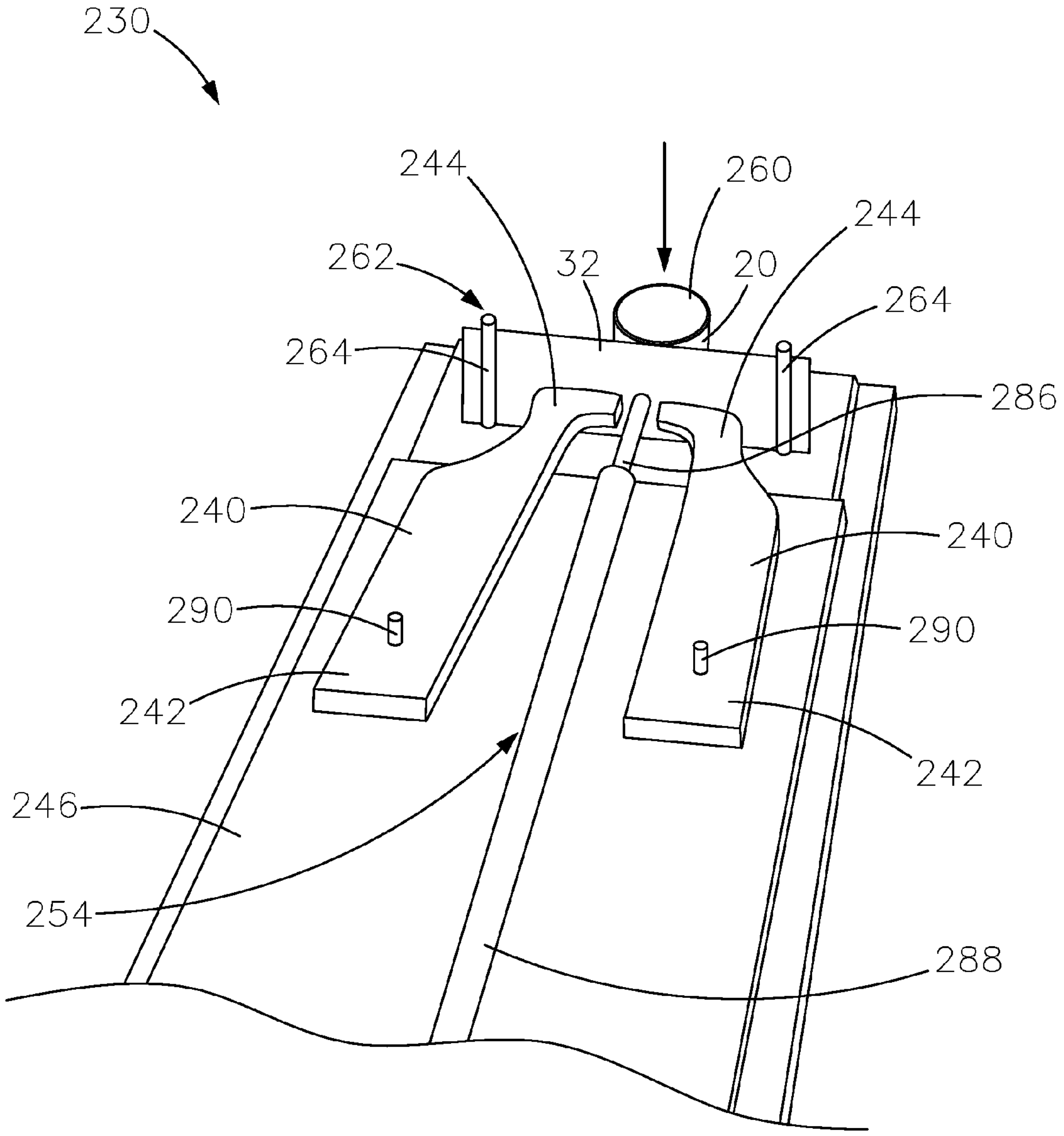
FIG. 11 is a perspective view of another apparatus for positioning a tape preform as a layer onto a substrate during the manufacture of a layered device, in accordance with the principles of the present disclosure.
Figure 12:
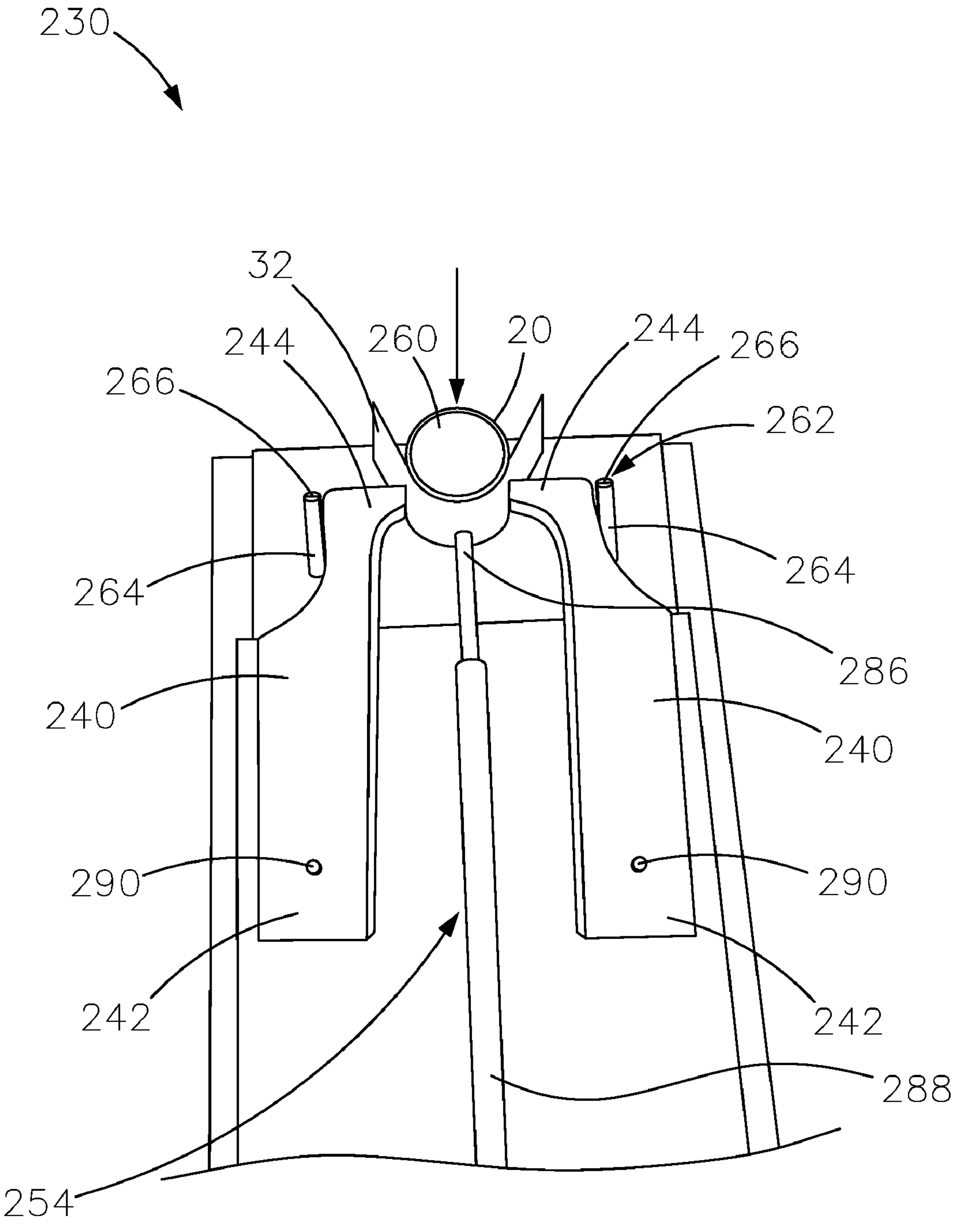
FIG. 12 is a perspective view of the apparatus of FIG. 11.

Now with reference to FIGS. 11 and 12, another form of an apparatus for positioning a tape preform as layer onto a substrate is illustrated and generally designated at 230. In this form, the positioning apparatus 230 includes a contact member 254 configured to engage a tape preform 32 against a substrate 20, which is in the form of a cylindrical rod. In some variations, the contact member 254 could include an inner cylindrical rod 286 that is movable with respect to an outer cylindrical rod 288.

The tape preform 32 may be held by a pre-positioning device 262, which may be similar to any of the pre-positioning devices 62, 162 hereinbefore described. For example, the pre-positioning device 262 could include holding pins 264 defining cutouts 266 for holding the tape preform 32.

In the variation of FIGS. 11 and 12, the positioning apparatus 230 may be designed such that the substrate 20 is configured to be pushed toward the contact member 254 to make contact between the contact member 254 and the substrate 20, with the tape preform 32 in between the contact member 254 and the substrate 20. In the alternative, or in addition, the positioning device 230 may be designed such that the contact member 254 advances forward to press the tape preform 32 against the substrate 20. Thus, in some forms, the substrate 20 remains stationary, and it could be positioned on a stationary mandrel 260, such as a mandrel similar to the mandrels 60 of FIGS. 3-7, by way of example. In order to move the contact member 254 toward the substrate 20, the contact member 254 could be secured to a base member 246, which could be connected to a translation device configured to translate the base member 246, the contact member 254, and the positioning members 240 (described below) toward the substrate 20.

As the substrate 20 and the contact member 254 move into contact with each other, the contact member 254 presses the tape preform 32 against the substrate 20. Then, the positioning members 240 are translated around the substrate 20 to engage the tape preform 32 against the substrate 20. The positioning members 240 may be secured to the base member 246 via pivot members 290 located proximal ends 242 of the positioning members 240. The pivot members 290 could be connected to biasing members, such as springs (not shown) to bias the distal ends 244 of the positioning members 240 toward each other. Thus, as the positioning members 240 are advanced around the substrate 20, the distal ends 244 press the tape preform 32 against the substrate 20.

Similarly to the contact member 254, the positioning members 240 may be advanced with respect to the substrate 20 either by the substrate 20 being pushed toward the contact member 254 (the inner cylinder 286 could be configured to recede into the outer cylinder 288 against a spring force as the substrate 20 is moved toward it), and/or by the base member 246 being translated toward the substrate 20, for example, with the use of a translating member (not shown).

After the tape preform 32 is positioned around the substrate 20, the substrate 20 and tape preform 32 may be inserted into a press, such as the press 68 hereinbefore described, to laminate or adhere the tape preform 32 to the substrate 20.

Figure 13:
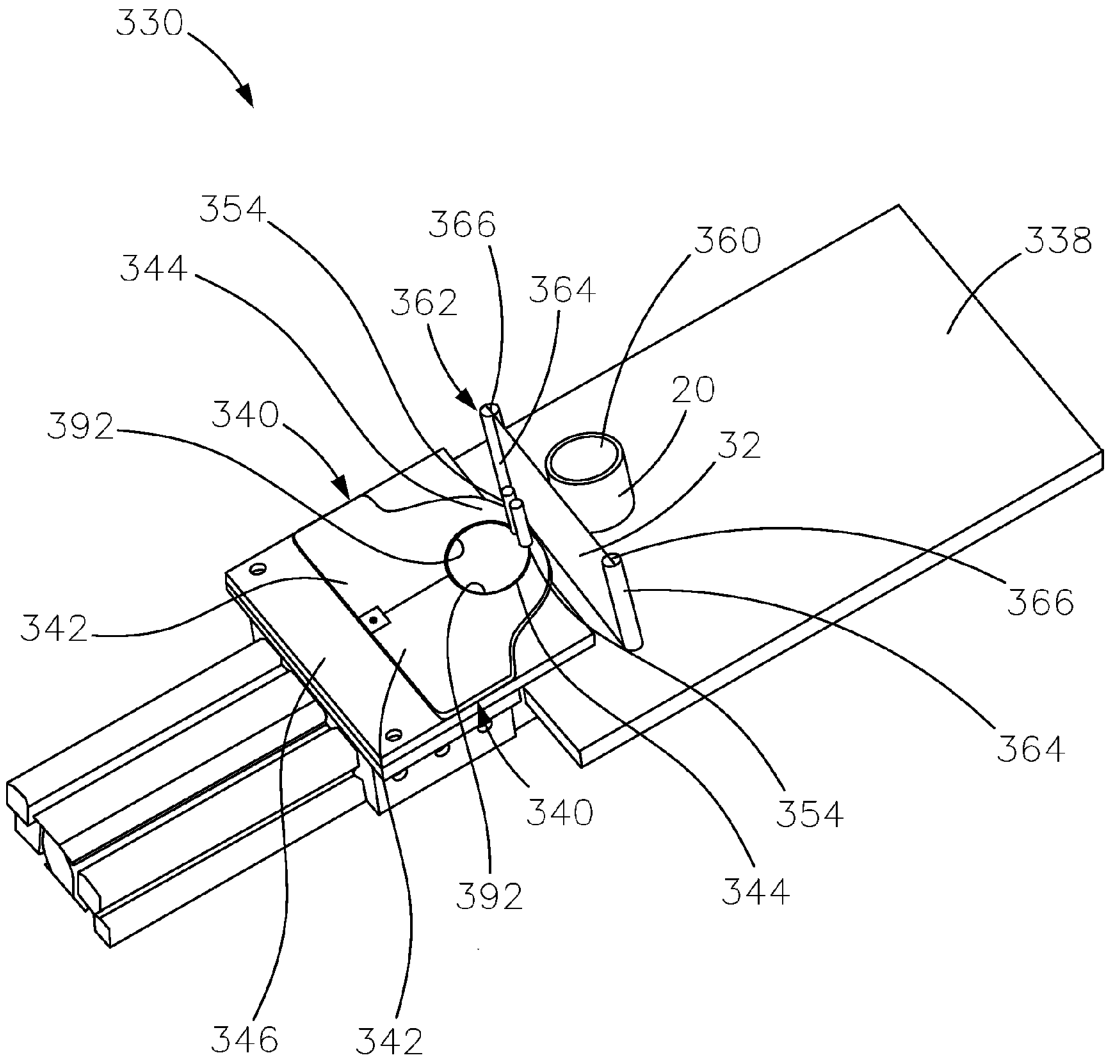
FIG. 13 is a perspective view of yet another apparatus for positioning a tape preform as a layer onto a substrate during the manufacture of a layered device, in accordance with the principles of the present disclosure.
Figure 14:
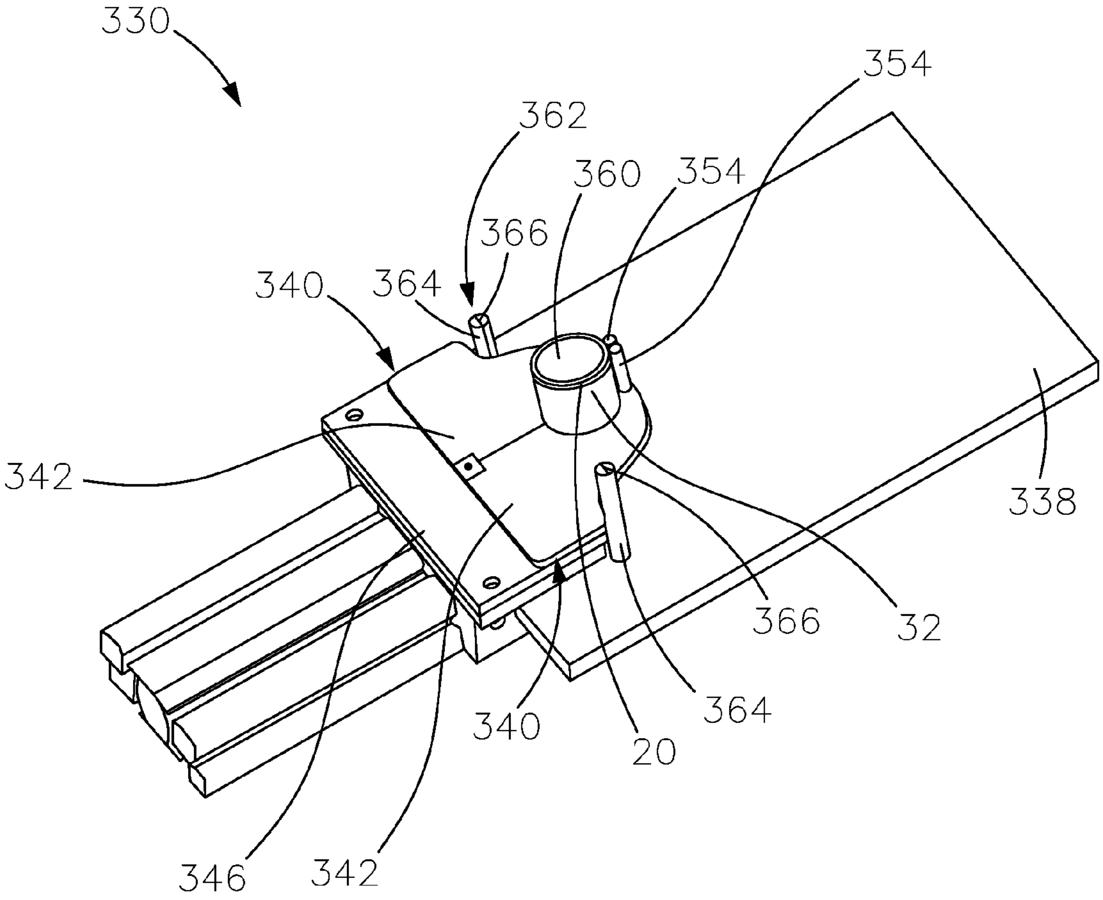
FIG. 14 is a perspective view of the apparatus of FIG. 13.

Now with reference to FIGS. 13 and 14, yet another variation of an apparatus for positioning a tape preform against a substrate is illustrated and generally designated at 330. A substrate 20 is held stationary by a substrate mandrel 360 located on a positioning plate 338. A pre-positioning device 362, including holding pins 364 defining cutouts 366, is used to hold a tape preform 32 in place, by way of example; however, it should be understood that other variations of pre-positioning devices 362 could be used without falling beyond the spirit and scope of the present disclosure.

The positioning apparatus 330 includes a set of positioning members 340, each of which include a proximal end portion 342 that is pivotally connected to a base member 346, and a distal end portion 344. Each distal end portion 344 includes a contact member 354 pivotally connected thereto. In some variations, an elastic contact member (not shown) could be disposed around the contact members 354 and a dowel pin (not shown) to provide additional support to hold the tape preform 32 against the substrate 20.

The base member 346 is configured to be translated toward the substrate 20 and the tape preform 32, such that the contact members 354 press the tape preform 32 against the substrate as they make contact with the tape preform 32 and the substrate 20. As the base member 346 is further translated toward the substrate 20, the contact members 354 press the tape preform 32 around and against the periphery of the substrate 20. After pressing the tape preform 32 around the periphery of the substrate 20, the contact members 354 contact each other, and the substrate 20 and tape preform 32 are held within a contoured inner profile 392 of the positioning members 340. The contoured inner profile 392 is shaped so as to contact the tape preform 32 around the substantial majority of the periphery, or in some forms, the entire periphery of the substrate 20. Thus, the contoured inner profile 392 provides additional support to hold the tape preform 32 against the substrate 20 until the tape preform 32 is adhered to the substrate 20.

Thereafter, it is contemplated that the tape preform 32 is adhered or laminated to the substrate 20 in any suitable manner, such as those hereinbefore described. For example, a press 68 could be used.

Figure 15:
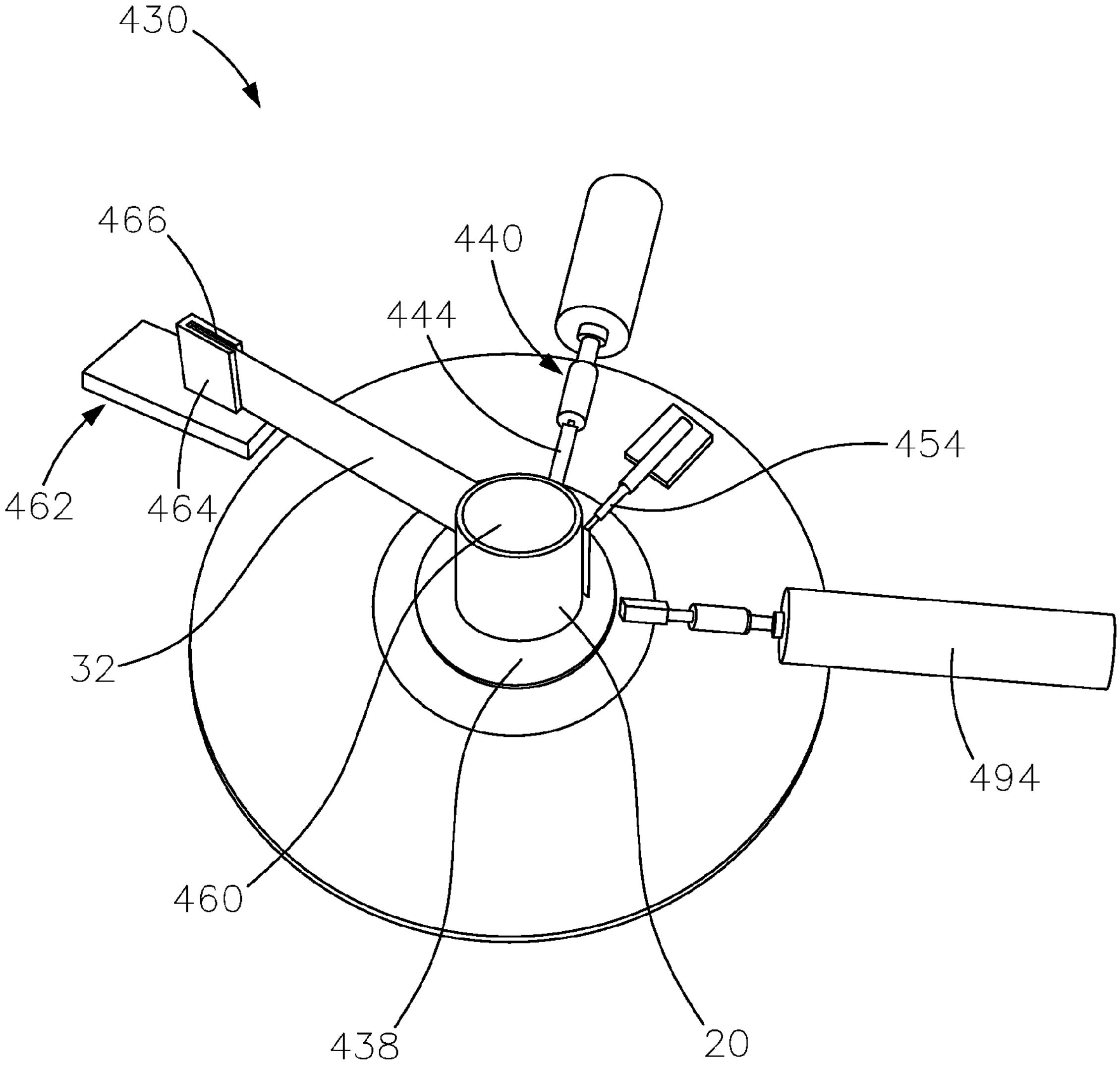
FIG. 15 is a perspective view of still another apparatus for positioning a tape preform as a layer onto a substrate during the manufacture of a layered device, in accordance with the principles of the present disclosure.
Figure 16:
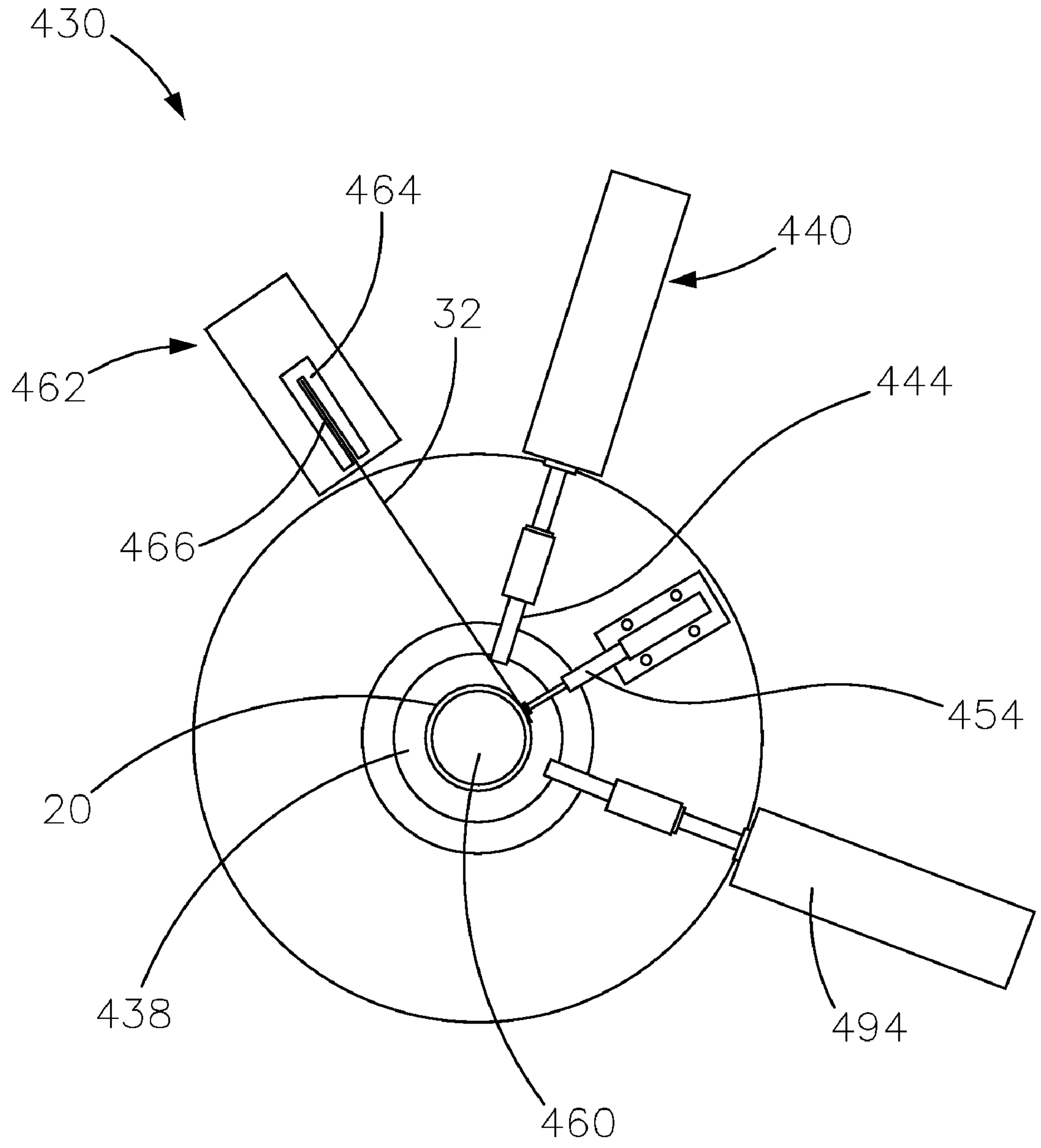
FIG. 16 is a plan view of the apparatus of FIG. 15.
Figure 17:
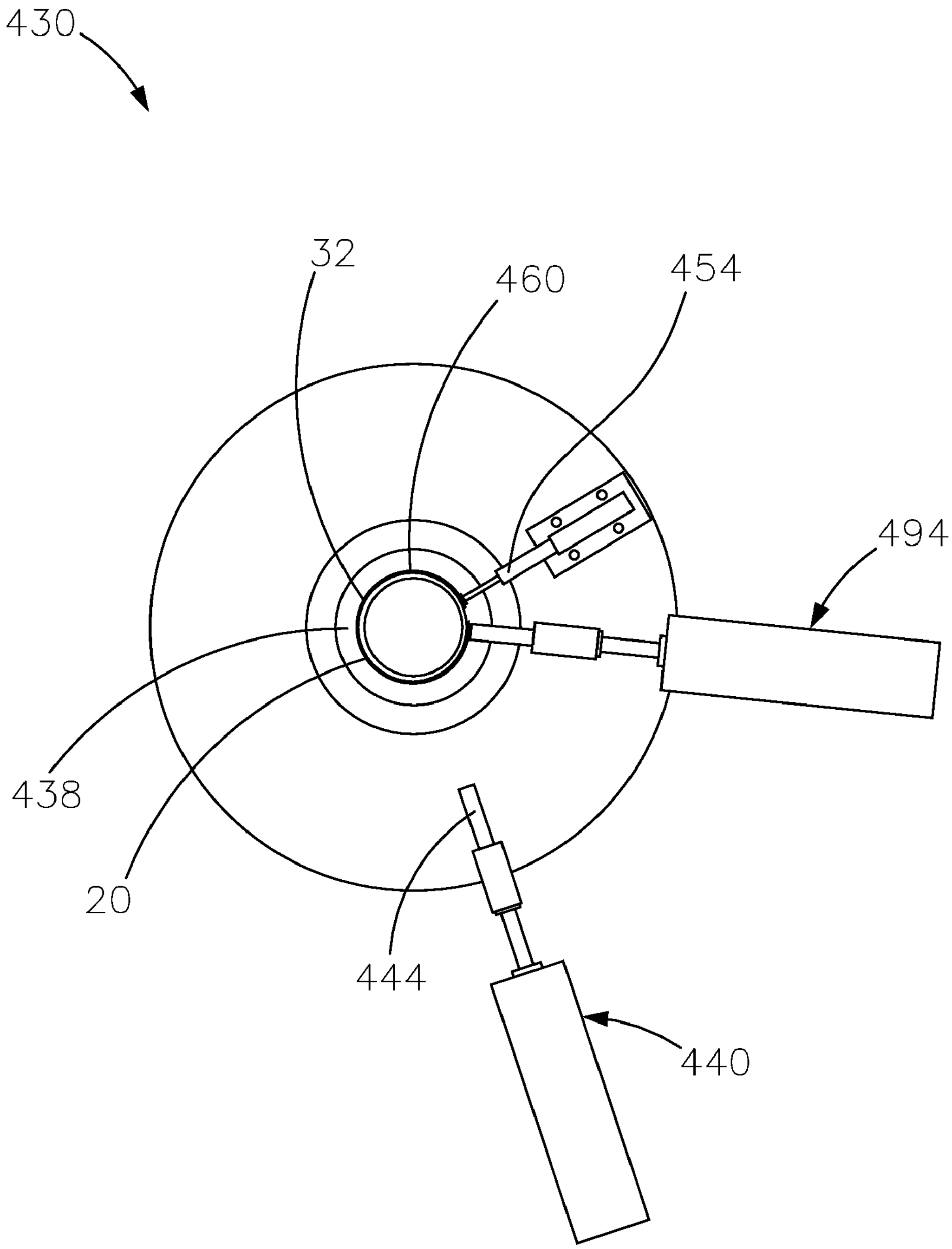
FIG. 17 is a plan view of the apparatus of FIGS. 15 and 16.

Referring now to FIGS. 15-17, yet another form of an apparatus for positioning a tape preform against a substrate is illustrated and generally designated at 430. The apparatus 430 includes a positioning plate 438, which has a substrate mandrel 460 secured thereto for holding a substrate 20. A pre-positioning device 462 is provided to hold a piece of tape preform 32 in place prior to the tape preform 32 being applied to the substrate 20. The pre-positioning device 462 includes a holding member 464 defining a cutout 466 to hold the tape preform 32.

With reference to FIGS. 15-16, to begin the positioning process, a first end of the tape preform 32 is held against the substrate 20, through the use a first contact member 454. A distal end portion 444 of a positioning member, such as a swiper arm 440, is then advanced into contact with the tape preform 32 to press the tape preform 32 against the substrate 20. The pre-positioning device 462 may then be advanced away to allow space for the swiper arm 440 to rotate around the substrate 20. The swiper arm 440 is rotated around the substrate 20 to engage the tape preform 32 with the substrate 20 around the periphery of the substrate 20. Now referring to FIG. 17, when the swiper arm 440 has rotated around the substrate 20 to engage the tape preform 32 around the periphery thereof, a second contact member 494 is advanced into contact with the tape preform 32 and the substrate 20 to hold the second end of the tape preform 32 against the substrate 20. The swiper arm 440 is then advanced away from the substrate 20 and the tape preform 32.

With the first contact member 454 holding the first end of the tape preform 32 against the substrate 20 and the second contact member 494 holding the second end of the tape preform 32 against the substrate 20, the substrate 20 and tape preform 32 are received into a press, such as the press 68 hereinbefore described. In the alternative, the substrate 20 and tape preform 32 may otherwise be subjected to a cycle of pressure, temperature, and time to adhere or laminate the tape preform 32 to the substrate 20. Once the bladder 70 of the press 68 is inflated to tightly press the tape preform 32 against the substrate 20, the first and second contact members 454, 494 may be released and withdrawn from the substrate 20 and the tape preform 32.

Figure 18:
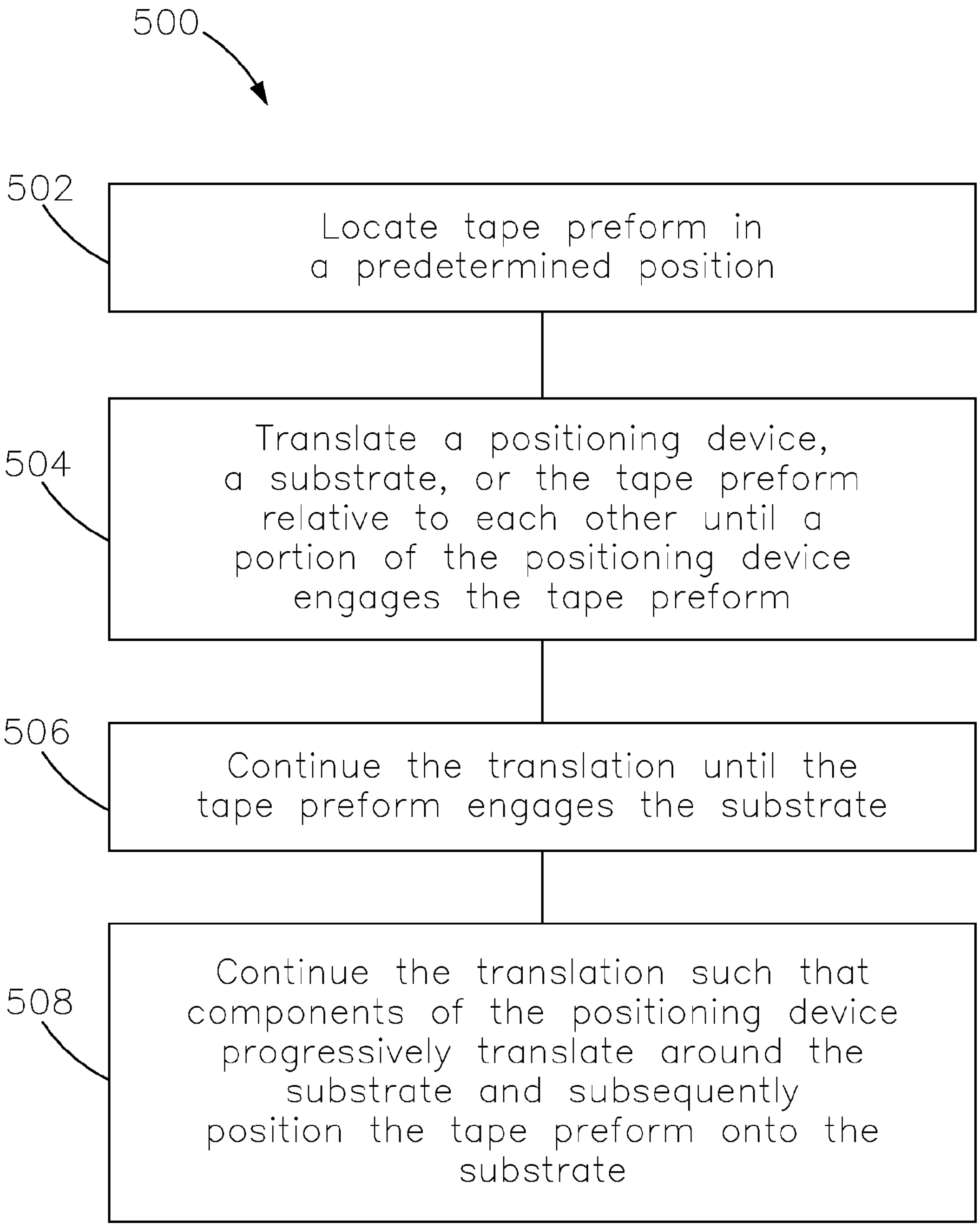
FIG. 18 is a block diagram illustrating a method of positioning a tape preform as a layer onto a substrate during the manufacture of a layered resistive device, in accordance with the teachings of the present disclosure.

Referring now to the block diagram of FIG. 18, a method 500 of positioning a tape preform as a layer onto a substrate during the manufacture of a layered resistive device is described. The method 500 includes a step 502 of locating the tape preform in a predetermined position. This step 502 may include the use of a pre-positioning device 62, 162, 262, 362, 462, as hereinbefore described. The method 500 also includes a step 504 of translating at least one of the following relative to each other: a positioning device, the substrate, and the tape preform. The translation occurs until a portion of the positioning device engages the tape preform. The positioning device could be provided as a grabber arm 40, a swiper arm 440, or any other suitable positioning device, such as the other positioning devices 240, 340 described herein, by way of example. The method 500 further includes a step 506 of continuing the translation until the tape preform engages the substrate and a step 508 of continuing the translation such that components of the positioning device progressively translate around the substrate and subsequently position the tape preform onto the substrate.

The method 500 may also include providing the positioning device such that the portion of the positioning device that first engages the tape preform and the components of the positioning device that progressively translate around the substrate move dependently with each other. For example, with reference to FIGS. 3-7, the In addition, the method 500 may include providing the substrate as translatable with the positioning device. For example, with reference to FIGS. 3-7, the substrate 20 is located on a substrate mandrel 60, which is translatable. Further, the entire positioning device 30 is provided on a movable cart.

The method 500 may further include providing the components of the positioning device that progressively translate around the substrate as being pivotable at one end and as moving the portion of the positioning device that first engages the tape preform at another end, while progressively translating around the substrate.

In another form, the method 500 may include translating a press onto the tape preform and the substrate while retracting the positioning device away from the substrate. Such translation may be accomplished utilizing a controller. For example, the positioning device, the substrate, the tape preform, or other components may be translated relative to each other using a controller.

In the various processes described above, the tape preform layer on the substrate 20 may be combined with other layers. For example, if the tape preform is provided as a base dielectric layer 26, the resistive layer 18 may be added to the dielectric tape layer 26 after the dielectric tape layer 26 is laminated to the substrate 20. The resistive layer 18 may be formed on the dielectric tape layer 26 using a layered process such as thin film, thick film, thermal spray, or sol-gel, all of which have been described above. A protective layer 28 may then be formed on the resistive layer by a layered process such as thin film, thick film, thermal spray, or sol-gel. Alternatively, the protective layer 28 may be a thick film dielectric tape, which may be applied by the method 500 and apparatuses 30, 230, 330, 430 described herein. In other words, the protective layer 28 may be a dielectric tape layer that is laminated to the resistive layer 18. In other embodiments, the resistive layer 18 may also or alternatively be applied as a preform tape 32.

As an alternative to applying the resistive and protective layers 18, 28 after a dielectric tape layer 26 has been laminated to the substrate 20 or target, the resistive layer 18, the protective layer 28, and/or conductors 22 may be preformed on the dielectric tape layer 26. In other words, the resistive layer 18, protective layer 28, and/or conductors 22 could be formed on the dielectric tape layer 26 before it is laminated to a substrate 20 or target. In this form, notches, cut-outs, or slots could also be pre-cut into or through the dielectric tape layer(s) 26 and any other functional layers attached thereto.

The present disclosure is merely exemplary in nature and, thus, variations that do not depart from the gist of the disclosure are intended to be within the scope of the present disclosure. Such variations are not to be regarded as a departure from the spirit and scope of the present disclosure.

What is claimed is:

1. An apparatus for positioning a tape preform as a layer onto a substrate during the manufacture of a layered resistive device comprising:

a substrate mandrel configured to hold the substrate;

at least one positioning member comprising opposed grabber arms spaced apart from each other, each of the opposed grabber arms defining a proximal end portion and a distal end portion, the opposed grabber arms being translatable relative to the substrate mandrel; and a contact member adapted to engage the tape preform against the substrate and move the tape preform around the substrate when the opposed grabber arms are translated toward the substrate mandrel, wherein the contact member and the distal end portions of the opposed grabber arms of the positioning member are configured to position the tape preform onto the substrate as a step in the manufacture of the layered resistive device.

2. The apparatus according to claim 1, wherein the contact member is elastic.

3. The apparatus according to claim 1 further comprising a base member onto which the positioning member and the contact member are mounted.

4. The apparatus according to claim 1 further comprising a pre-positioning device adapted for holding the tape preform in place prior to positioning on the substrate.

5. The apparatus according to claim 4, wherein the pre-positioning device comprises opposed holding members defining cutouts for placement of the tape preform.

6. The apparatus according to claim 4, wherein the pre-positioning device comprises reels that feed a continuous stock of tape preform.

7. The apparatus according to claim 4 further comprising a translating member, wherein the pre-positioning members and the substrate mandrel are mounted to the translating member.

8. The apparatus according to claim 1, wherein the opposed grabber arms each comprise a contoured inner profile extending between the proximal end portion and the distal end portion.

9. The apparatus according to claim 1, wherein the positioning member comprises a swiper arm.

10. An apparatus for positioning a tape preform as a layer onto a substrate during the manufacture of a layered resistive device comprising:

a base member;

a plurality of grabber arms, the grabber arms being spaced apart and defining a proximal end portion and a distal end portion, the proximal end portion mounted to the base member, and each grabber arm comprising a support member proximate the distal end portion and a contoured inner profile surface extending between the proximal end portion and the distal end portion;

an elastic contact member secured to the base member and disposed around the support members of the grabber arms; and a substrate mandrel configured to hold the substrate, the elastic contact member being configured to engage the tape preform against the substrate as a step in the manufacture of the layered resistive device, wherein the grabber arms are translatable relative to the substrate mandrel.

11. The apparatus according to claim 10, wherein the grabber arms comprise two opposed grabber arms pivotally mounted to the base member.

12. The apparatus according to claim 11 further comprising opposed translation devices secured to the proximal end portions of the opposed grabber arms and configured to pivot the grabber arms on the base member.

13. The apparatus according to claim 10 further comprising a translation device secured to the base member and configured to translate the base member relative to the substrate.

14. The apparatus according to claim 10, wherein the contoured inner profile surfaces of the grabber arms are configured to correspond with a shape of the substrate.

15. The apparatus according to claim 10 further comprising a dowel pin secured to the base member, wherein the elastic contact member is secured to the base member by being disposed around the dowel pin.

16. The apparatus according to claim 10 further comprising a pre-positioning device adapted for holding the tape preform in place prior to positioning on the substrate.

17. The apparatus according to claim 16, wherein the pre-positioning device is offset a predetermined distance from the substrate.

18. The apparatus according to claim 16, wherein the pre-positioning device comprises opposed holding members defining cutouts for placement of the tape preform.

19. The apparatus according to claim 16, wherein the pre-positioning device comprises reels that feed a continuous stock of tape preform.

20. The apparatus according to claim 16, wherein the pre-positioning device comprises a vacuum source.

21. The apparatus according to claim 16 further comprising a translating member, wherein the pre-positioning device and the substrate mandrel are mounted to a positioning plate, the positioning plate being connected to the translating member.

22. The apparatus according to claim 10 further comprising a cutting device adapted to cut the tape preform to a predetermined size prior to positioning the tape preform onto the substrate.

23. The apparatus according to claim 10, wherein the apparatus defines a mobile unit.

24. The apparatus according to claim 10 further comprising a press positioned proximate the grabber arms and elastic contact member and adapted to be sequentially placed around the tape preform and the substrate after the grabber arms and elastic contact member have positioned the tape preform onto the substrate.

25. An apparatus for the manufacture of a layered resistive device comprising:

at least one first grabber arm, the first grabber arm defining a proximal end portion and a distal end portion, and the first grabber arm comprising a contoured inner profile surface extending between the proximal end portion and the distal end portion;

a first substrate mandrel;

a first contact member operable with the first grabber arm and adapted to engage a tape preform against a first substrate as a step in the manufacture of a first layered resistive device, the first substrate being disposed proximate the first substrate mandrel;

at least one second grabber arm, the second grabber arm defining a proximal end portion and a distal end portion, and the second grabber arm comprising a contoured inner profile surface extending between the proximal end portion and the distal end portion;

a second substrate mandrel;

a second contact member operable with the second grabber arm and adapted to engage a tape preform against a second substrate as a step in the manufacture of a second layered resistive device, the second substrate being disposed proximate the second substrate mandrel, wherein the contact members and the contoured inner profile surfaces of the grabber arms are configured to sequentially position the tape preforms onto the substrates; and at least one press positioned proximate the grabber arms and contact members and adapted to be sequentially placed around each of the tape preforms and the substrates after the grabber arms and contact members have positioned the tape preforms onto the substrates.

26. The apparatus according to claim 25, wherein the at least one first grabber arm comprises a first set of opposed grabber arms, and the at least one second grabber arm comprises a second set of opposed grabber arms.

27. The apparatus according to claim 26, wherein the first set of opposed grabber arms, the first substrate mandrel, and the first contact member are disposed opposite the second set of opposed grabber arms, the second substrate mandrel, and the second contact member.

28. The apparatus according to claim 25, wherein the press is positioned vertically from the substrate mandrels.

29. The apparatus according to claim 25, wherein the contact members are elastic bands that are positioned around the distal end portions of the grabber arms.

30. The apparatus according to claim 25 further comprising a translating member onto which the first substrate mandrel and the second substrate mandrel are mounted, wherein the translating member is translatable to align the substrate mandrels with the press.

31. The apparatus according to claim 30 further comprising a controller that controls the position of the translating member.

32. The apparatus according to claim 25 further comprising translation devices that position the grabber arms and the contact members, wherein the translation devices communicate with a controller.

33. The apparatus according to claim 25, wherein the apparatus defines a mobile unit.

* * * * *